United States Patent
Osswald et al.

(10) Patent No.: US 12,540,908 B2
(45) Date of Patent: Feb. 3, 2026

(54) GAS DETECTION DEVICE AND GAS DETECTION PROCESS WITH A DETECTOR AND WITH A MODULATOR

(71) Applicant: Dräger Safety AG & Co. KGaA, Lübeck (DE)

(72) Inventors: Jürgen Osswald, Lübeck (DE); Malte Baesler, Lübeck (DE); Sandra Balhorn, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 857 days.

(21) Appl. No.: 17/668,827

(22) Filed: Feb. 10, 2022

(65) Prior Publication Data

US 2022/0260512 A1     Aug. 18, 2022

(30) Foreign Application Priority Data

Feb. 16, 2021 (DE) .................. 10 2021 103 563.5

(51) Int. Cl.
    *G01N 25/22*     (2006.01)
    *G01N 33/00*     (2006.01)

(52) U.S. Cl.
    CPC .......... *G01N 25/22* (2013.01); *G01N 33/0027* (2013.01)

(58) Field of Classification Search
    CPC ............... G01N 25/22; G01N 33/0027; G01N 33/0047; G01N 33/0063; G01N 27/16; G08B 21/16; E21F 17/18
See application file for complete search history.

(56) References Cited

U.S. PATENT DOCUMENTS 10,234,412 B2    3/2019   Swanson et al.
2020/0393432 A1*   12/2020   Swanson .............. G01N 27/404

FOREIGN PATENT DOCUMENTS

| DE | 102005037529 A1 | 2/2006 |
|---|---|---|
| DE | 102013018457 A1 | 5/2015 |
| DE | 102005024394 B4 | 8/2015 |
| DE | 102017005713 A1 | 12/2018 |
| DE | 102017011530 A1 | 6/2019 |
| DE | 102018005318 A1 | 1/2020 |
| EP | 0849594 A2 | 6/1998 |
| EP | 3105571 B1 | 7/2018 |
| EP | 2867665 B1 | 6/2019 |

\* cited by examiner

*Primary Examiner* — Robert J Eom
(74) *Attorney, Agent, or Firm* — McGlew and Tuttle, P.C.

(57) ABSTRACT

A gas detection device and process detect a combustible target gas. A detector chamber (6) encloses a detector (10), and a modulator chamber (5) encloses a modulator (15). The target gas can flow from an area to be monitored through into the modulator chamber and from the modulator chamber into the detector chamber. An electrical voltage is applied to the modulator and to the detector to heat them, oxidizing the target gas in the modulator chamber and in the detector chamber. Heat energy is released bringing about an increase of the temperature of the detector. A detector sensor measures a detection variable which depends on the detector temperature. The voltage is applied to the modulator such that the temperature of the modulator oscillates. An analysis unit checks whether the detection variable oscillates synchronously with the modulator temperature, indicating the target gas is present.

20 Claims, 12 Drawing Sheets

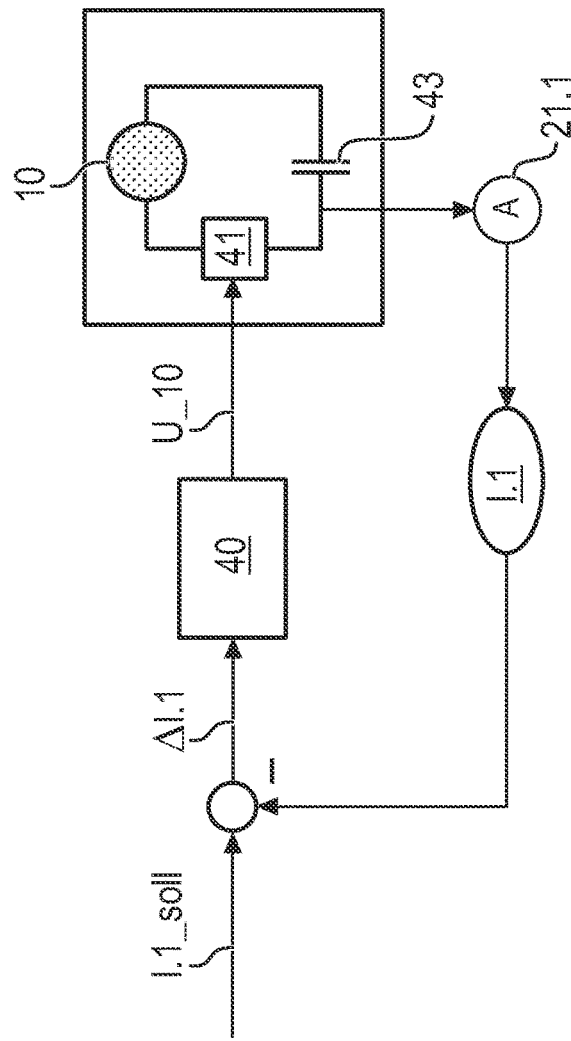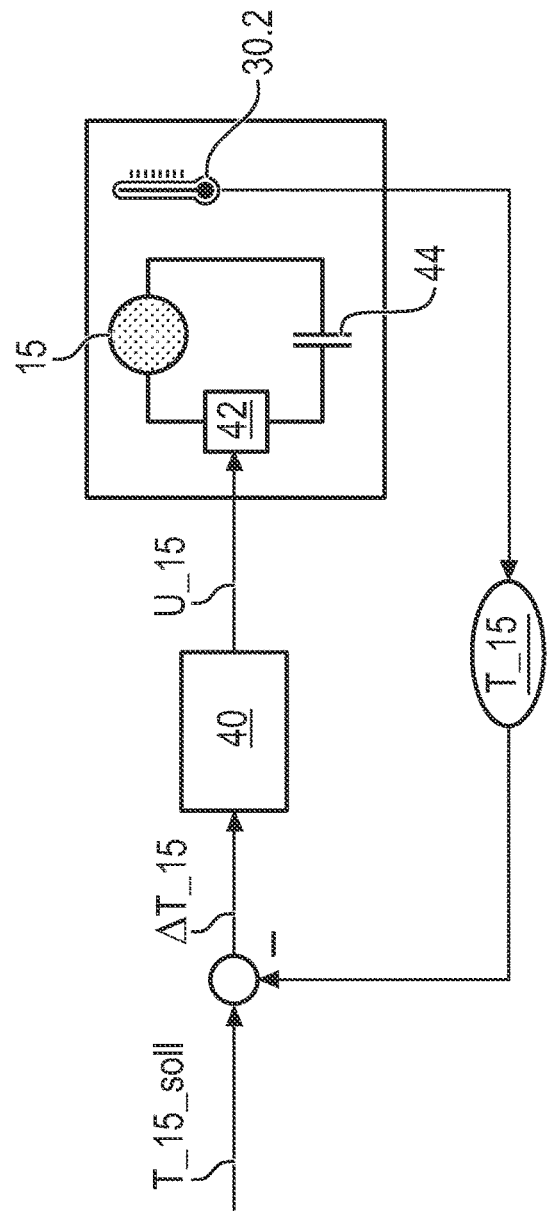
FIG. 4a
FIG. 4b

GAS DETECTION DEVICE AND GAS DETECTION PROCESS WITH A DETECTOR AND WITH A MODULATOR

CROSS REFERENCE TO RELATED APPLICATIONS

This application claims the benefit of priority under 35 U.S.C. § 119 of German Application 10 2021 103 563.5, filed Feb. 16, 2021, the entire contents of which are incorporated herein by reference.

TECHNICAL FIELD

The present invention pertains to a gas detection device and to a gas detection process, which are capable of automatically monitoring a spatial area for the presence of at least one target gas. The target gas or a target gas to be detected is combustible in a temperature range occurring during the operation of the gas detection device. The area to be monitored is, for example, a mine or a refinery or a transport vehicle or a heating system operated with a combustible fluid or a warehouse.

TECHNICAL BACKGROUND

A method for detecting a combustible target gas comprises the steps of heating a gas mixture in a chamber and measuring the heat energy being generated in the chamber. If the gas mixture contains a combustible target gas, then the target gas is oxidized, and the oxidation releases heat energy. A physical variable correlating with the released heat energy is measured. The present invention also uses this principle. A sensor operating in this manner is also called a "heat tone sensor." A variety of such sensors have become known.

In the process described in EP 0 849 594 A2, a catalytic sensor is operated in a pulsed manner, as a result of which the temperature of the sensor oscillates between a minimum temperature and a maximum temperature. The minimum temperature is below the catalytic use temperature of a target gas, the maximum temperature is above this catalytic use temperature.

The process described in DE 10 2005 024 394 B4 for measuring a gas concentration uses a thermal measuring element in the form of a pellistor. The measuring element is operated in a pulsed manner, wherein rest phases, which are at least half as long as the measuring phases, are observed between the pulses. The response of the measuring element to at least one pulse is analyzed for measuring the gas concentration in the environment of the measuring element. In this connection, electrical measured variables are analyzed for determining transient states of the measuring element.

A process, in which a catalytic sensor is operated in a pulsed manner, is also described in U.S. Pat. No. 10,234,412 B2. A current supply of the sensor is periodically switched on and switched off. As a result, the temperature of the sensor is changed periodically. The dynamics of the sensor during the periodic switching on and switching off is analyzed to detect which species a target gas is.

A dual detector, which comprises two similar pellistors 12, 22 in a respective cavity 10 or 20, is described in the introduction to the specification of DE 10 2017 005 713 A1. One side of the first cavity 10 is permeable to gas, so that gas from the environment can reach the first cavity 10. The second cavity 20 is in a fluid connection with the environment only via a small diffusion opening 28, wherein the diffusion opening 28 is located in an otherwise gas-tight diffusion barrier 24.

Such a dual detector is described in the description of the figures of DE 10 2017 005 713 A1. An analysis unit analyzes the signals from the two similar pellistors 12, 22 and uses the signal of the second pellistor 22 as a reference signal, with which the signal of first pellistor is compared.

The heat tone sensor of DE 10 2017 011 530 A1 comprises a housing 110 with a gas inlet 111 and with a gas outlet 112. A gas stream with a gas mixture to be analyzed is fed from the gas inlet 111 to the gas outlet 112. The gas stream flows around or flows through a measuring element 130. The measuring element 130 catalytically burns a part of the gas stream and measures the quantity of heat being released during the burning. A sensor 160 is configured similar to the measuring element 130 and the gas stream likewise flows around it, but it uses a catalytically inactive material, while the measuring element 130 has a catalytically active material. The measured signal of the sensor 160 can be used to compensate environmental changes by calculation. In one embodiment, at least two temperature sensors 380 and 390 measure the temperature of a catalytically active material 333.

The gas sensor which is described in DE 10 2005 037 529 A1 is capable of detecting carbon dioxide and comprises a detection element 1, a filter 2 and two heating elements 3 and 4 which are arranged in a housing 6 with a diffusion-limiting opening 5. The heating element 3 is located between the filter 2 and the detection element 1, and the heating element 4 is located between the opening 5 and the filter 2. The filter 2 lets carbon dioxide pass through, but filters out ethanol and other interfering gases and absorbs them. The filter 2 exerts the filtering action only during a measuring phase. In a regeneration phase, the heating elements 3 and 4 heat the filter 2, so that the filter 2 again releases (desorbs) the previously absorbed interfering gases. The gas sensor preferably comprises two parallel sensor systems, and one sensor system may be located in the measuring phase and one sensor system may be located in the regeneration phase.

SUMMARY

A basic object of the present invention is to provide a gas detection device,
  wherein the gas detection device comprises a detector chamber and a detector in the detector chamber,
  wherein the detector is capable of oxidizing a combustible target gas to be detected,
  wherein an oxidation of the target gas in the detector chamber increases the temperature of the detector, and
  wherein the gas detection device is capable of detecting the presence of a combustible target gas with higher reliability than prior-art gas detection devices.

Furthermore, the basic object of the present invention is to provide a process, which is capable of detecting with higher reliability the presence of a combustible target gas using such a gas detection device.

The object is accomplished by a gas detection device having features according to the invention and by a gas detection process having features according to the invention. Advantageous embodiments are described herein. Advantageous embodiments of the gas detection device according to the present invention are, if meaningful, also advantageous embodiments of the gas detection process according to the present invention and vice versa.

The gas detection device according to the present invention and the gas detection process according to the present invention are capable of automatically monitoring a spatial area for whether or not a combustible target gas is present in this area. The device and the process are in some cases also capable, as a rule, of detecting the case that a plurality of combustible target gases are present at the same time.

The gas detection device according to the present invention comprises
- a detector,
- a modulator,
- a detector chamber,
- a modulator chamber,
- a detector sensor arrangement comprising at least one detector sensor, and
- a signal-processing analysis unit.

The modulator chamber encloses the modulator. The modulator chamber is in an outer fluid connection with the area to be monitored. There is an inner fluid connection between the modulator chamber and the detector chamber.

Thanks to these two fluid connections a gas mixture can flow out of the area to be monitored into the modulator chamber and through the modulator chamber into the detector chamber.

The term "chamber" designates any object which encloses a space, except for defined openings and unavoidable gaps and slots, in a gas-tight manner.

A "fluid connection" is defined as a mechanical connection through which a fluid, especially a gas or a gas mixture, can flow into the respective chamber and optionally can flow out of the chamber again.

The detector chamber separates the detector from the area to be monitored. Optionally the modulator chamber additionally contributes to separating the detector from the area to be monitored. The cross-sectional area of a fluid connection between the detector chamber and the area to be monitored is at most 25% of the cross-sectional area of the inner fluid connection, preferably at most 10%. In an especially preferred embodiment, the detector chamber separates the detector in a gas-tight manner from the area to be monitored, so that no fluid at all can flow out of the area to be monitored directly into the detector chamber, apart from, as a rule, unavoidable gaps. The inner fluid connection is not taken into consideration in the percentages and the preferred property that the detector chamber gas-tightly separates the detector from the area.

The gas detection device is capable of applying a respective electrical voltage both to the detector and to the modulator. If an electrical voltage is applied to the detector, then electric current flows through the detector. As a consequence, a component of the detector, for example, a wire, through which electric current flows, is heated because of the electric current flowing through the detector. If an electrical voltage is applied to the modulator, then electric current flows through the modulator, and a component of the modulator is heated because of the electric current flowing through the modulator.

The detector and the modulator are configured as follows: A heating of the detector brings about an oxidation of a combustible target gas to be detected, which target gas is located in the detector chamber. This oxidation depends on the temperature of the detector, wherein the electric current flowing through heats the component of the detector. A heating of the modulator brings about an oxidation of a combustible target gas to be detected, which target gas is located in the modulator chamber, wherein the electric current flowing through heats the component of the modulator. This oxidation depends on the temperature of the modulator.

Furthermore, the detector is configured as follows: When a target gas is oxidized in the detector chamber, then the temperature of the detector is increased.

Electric current flows through a respective component of the detector and of the modulator when electrical voltage is applied, and the component is thereby heated. "The temperature" of the detector or modulator is defined as an average temperature of this current-conducting component, wherein the averaging is based on the spatial expansion of the current-conducting component. The heated component may, of course, heat additional areas of the detector and/or modulator.

The detector sensor or at least one detector sensor of the detector sensor arrangement is capable of measuring a detection variable of the detector. In one alternative, the detection variable is the detector temperature itself, which is increased by the oxidation of the target gas. In another alternative, the detection variable is a parameter of the detector, and this parameter correlates with the detector temperature. In particular, the parameter is the electrical voltage that is applied to the detector, or the intensity of the electric current that flows through the detector, or the electrical resistance of the detector or the electrical power consumed by the detector. As is known, the electrical resistance of a component through which electric current flows is in many cases changed, when the temperature in the environment of the component and thus the temperature of the component changes. This dependence between the resistance and the temperature is based on the material of the component, through which current flows, and is known or can be determined empirically. It is possible that a plurality of detection variables are measured.

According to the present invention, the gas detection device is capable of applying an electrical voltage to the modulator. The electrical voltage is applied such that an oscillating electric current flows through the modulator and, therefore, the temperature of the modulator, through which current flows, also oscillates over time. An "oscillation" of a physical variable is defined as the operation that the physical variable increases in a plurality of consecutive increase periods and decreases in a plurality of consecutive decrease periods, wherein there is a respective decrease period after each increase period.

According to the present invention, the gas detection device is capable of applying an electrical voltage to the detector, so that an electric current flows through the detector, and the detector temperature is increased by the current. In one alternative, the detector temperature, which is brought about by the application of the electrical voltage and the resulting heating of the detector component, does not oscillate at all over time. In another alternative, the detector temperature also oscillates, but with a lower amplitude than the modulator temperature.

The analysis unit is capable of automatically detecting the presence of a combustible target gas. For this detection, the analysis unit analyzes measured values of the detector sensor or of at least one detector sensor and automatically determines (decides) whether the detection variable oscillates synchronously with the oscillating modulator temperature or not. In this case, the analysis unit determines whether or not the synchronous oscillation takes place in the entire analysis period or in at least a part of the analysis period. In the case of a synchronous oscillation, a combustible target gas is present and detected. When making the determination (decision), the analysis unit preferably ignores an unavoidable noise in the time course (time curve) of the detection variable and preferably only takes into consideration an oscillation with an amplitude above a predefined minimum amplitude. The analysis unit preferably automatically determines that no combustible target gas is present if no synchronous oscillation over time, or at least no oscillation above the minimum amplitude, is detected in the analysis period (part).

A gas mixture, which may contain the target gas to be detected or at least one target gas to be detected, flows out of the area to be monitored through the outer fluid connection into the modulator chamber. This gas mixture in the modulator chamber surrounds the modulator. A part of this gas mixture flows into the detector chamber through the inner fluid connection.

According to the present invention, an electrical voltage is applied to the modulator. By applying the voltage, an electric current flows through the modulator, and as a result, a component of the modulator is heated. The electrical voltage is applied such that the temperature of the modulator resulting from the heating oscillates over time.

If the gas mixture in the area to be monitored contains at least one combustible target gas, then this target gas flows as a part of the gas mixture through the outer fluid connection into the modulator chamber. A target gas located in the modulator chamber is oxidized, especially as a function of the oscillating temperature of the modulator and thus as a function of the heating of the modulator, wherein the applied electrical voltage has brought about this heating. It is, of course, possible that no combustible target gas is present in the area to be monitored and thus also in the modulator chamber, and the heated modulator is therefore currently not capable of oxidizing any target gas.

When the modulator temperature has a high value, a large part of or even all the combustible target gas in the modulator chamber is oxidized. When the modulator temperature has a low value, then only a small part or even no target gas at all is oxidized in the modulator chamber. In many cases, as a rule, the higher the temperature of the modulator is, the higher is the portion of the combustible target gas in the modulator chamber being oxidized. Of course, the heated modulator is only capable of oxidizing target gas when a combustible target gas is present in the area to be monitored and thus also in the modulator chamber.

The term "oxidation" comprises an operation in which the combustible target gas is chemically oxidized, but does not necessarily burn with an open flame or even explode by an uncontrolled oxidation operation. The term "oxidation" also comprises a burning with an open flame or even an explosion, which may occur because of a sufficiently high temperature of the modulator or of the detector when the combustible target gas reaches a sufficiently high concentration in the respective chamber.

The gas mixture reaches the modulator chamber from the area to be monitored through the outer fluid connection and reaches the detector chamber through the inner fluid connection. Because an electrical voltage is applied to the detector, the detector component is heated. The detector oxidizes combustible target gas that is present in the detector chamber, but, of course, only if the gas mixture in the detector chamber contains a combustible target gas with sufficiently high concentration. The operation that combustible target gas is oxidized in the detector chamber releases heat energy, feeds at least a part of the released heat energy to the detector and therefore increases the temperature of the detector, compared with a state without combustible target gas in the detector chamber. The brought-about temperature increases in comparison to the temperature which is caused exclusively by the applied electrical voltage. This increased temperature correlates with the quantity and/or with the concentration of the target gas in the detector chamber. A large quantity or a high concentration of the target gas leads to a high temperature increase, a low quantity or concentration leads to a low temperature increase.

According to the present invention, the detector chamber essentially separates the detector from the environment, namely except for the inner fluid connection to the modulator chamber, except for the optional openings, the cross-sectional area of which is at most 25% of the cross-sectional area of the inner fluid connection, and except for unavoidable slots or gaps, which occur, as a result, especially because of production tolerances and material changes and drifts in the course of use. The detector chamber preferably encloses the detector, except for the inner fluid connection, in a gas-tight manner, i.e., without optional construction-related openings. Thanks to the detector chamber, a gas mixture can flow exclusively or essentially only through the modulator chamber and the inner fluid connection into the detector chamber, but not at all or only to a lesser extent directly out of the area to be monitored into the detector chamber.

It is possible that the modulator chamber and the detector chamber are arranged in a common housing, which has two openings for the two fluid connections. It is possible that the detector chamber is in a fluid connection with an additional chamber of the gas detection device, wherein this additional chamber lets, however, likewise no or only a little gas flow out of the environment into the detector chamber, because the additional chamber is sealed in a gas-tight manner against the area to be monitored.

When the modulator has a high temperature, a large part of the target gas in the modulator chamber is oxidized. As already explained farther above, combustible target gas can essentially only reach the detector chamber through the modulator chamber. Therefore, only a little combustible target gas or no combustible target gas at all is located in the detector chamber when the modulator temperature has a high temperature value. This effect occurs even if the area to be monitored contains a combustible target gas and this combustible target gas reaches the modulator chamber through the outer fluid connection. The detector chamber prevents a relevant quantity of combustible target gas from "bypassing" the modulator and from flowing out of the area directly into the detector chamber. Rather, a gas mixture and thus a combustible target gas can reach the detector chamber from the area to be monitored essentially only through the modulator chamber. When the modulator temperature has a high temperature value, the detector component is therefore essentially only heated by the electric current that flows through the detector, regardless of whether or not a combustible target gas is located in the environment of the detector chamber. In this case no or only a little target gas is present in the detector chamber, which the detector could oxidize, regardless of whether or not such a combustible target gas is present in the area to be monitored. By contrast, when the modulator has a low temperature, only a small part of the target gas or even no target gas at all is oxidized in the modulator chamber. Therefore, a large quantity of combustible target gas flows through the inner fluid connection into the detector chamber at a low modulator temperature, provided the area to be monitored contains a combustible target gas. The heated detector oxidizes at least a part of this target gas in the detector chamber. As a result, the detector is heated further, i.e., in addition to the heating because of the electrical voltage applied. At a low modulator temperature the temperature of the detector thus results from an overlap of the heating, which the applied voltage brings about, and the heating, which the oxidation of the target gas brings about.

According to the present invention, the modulator temperature oscillates over time, especially as a result of the oscillating electrical voltage applied. The result of the just described chain of effects is that the concentration of a combustible target gas in the detector chamber oscillates and therefore also the detector temperature and thus the detection variable oscillates, and this detection variable is influenced by the oxidation of the target gas in the detector chamber.

Because of the chain of effects described above this oscillation of the detector temperature is synchronous with the oscillation of the modulator temperature and, as a rule, also synchronous with the oscillation of the electrical voltage being applied to the modulator. A synchronous oscillation of two variables is defined as an oscillation, in which the frequency of the one oscillating variable deviates by at most 50%, preferably at most by 20%, from the frequency of the other oscillating variable. The amplitudes of the oscillations may differ greatly from one another, and the two oscillations may occur with an offset (phase shift) in time.

The detector sensor or at least one detector sensor measures a detection variable of the detector. The detection variable is the detector temperature or correlates with the detector temperature and hence likewise oscillates. This oscillation of the detector temperature and thus of the detection variable occur only if the gas mixture, which reaches the modulator chamber through the outer fluid connection and from there the detector chamber through the inner fluid connection, has a sufficiently high concentration of at least one combustible target gas. Otherwise, the detection variable does not oscillate synchronously. The oscillation of the detector temperature and thus the oscillation of the detection variable are caused by the oscillation of the modulator temperature and correlate with the electrical voltage that is applied to the modulator, and/or with the current intensity of the electric current flowing through the modulator. Oscillation of the detector temperature and thus of the detection variable, which are caused by a concentration of the combustible target gas in the detector chamber, which concentration is variable over time, is designated below as "significant oscillation." This significant oscillation brings about a significant oscillation as well of the detection variable which the detector sensor or a detector sensor measures. If a significant oscillation is present, it is certain that a combustible target gas is present. If no significant oscillation is present, no combustible target gas above a detection limit is present. A significant oscillation can, as a rule, reliably be distinguished from an unavoidable temporal noise of the detection variable and from a change over time of the concentration of the target gas in the area to be monitored.

It is possible that a significant oscillation takes place only in a part of the analysis period. For example, a combustible target gas is released into the area to be monitored in the course of the analysis period, i.e., it was not yet present at the beginning of the analysis period. In addition, in some cases after the startup of the gas detection device according to the present invention, a time period elapses until a gas mixture flows out of the area to be monitored into the modulator chamber and farther into the detector chamber, especially if the gas mixture reaches the detector chamber exclusively by diffusion, i.e., it is not suctioned in. Therefore, a significant oscillation begins in many cases only a certain time period after the gas detection device was put into operation.

The detector sensor or at least one detector sensor measures the detection variable and therefore directly or indirectly the temperature of the detector, which is increased by the oxidation of the target gas and drops again in the absence of combustible target gas in the detector chamber. In many cases, the analysis unit is already capable, because of the measured values of the detector sensor or of a detector sensor, of automatically deciding whether a significant oscillation is present or not. The time course of the detector temperature and/or the time course of the electrical voltage being applied to the detector and/or the current intensity at the detector can be measured and therefore act as the detection variable in one embodiment.

The detector sensor repeatedly measures the detection variable, i.e., directly the current temperature of the detector or another detector parameter which correlates with the current detector temperature, for example, the electrical resistance. The analysis unit receives measured values from this detector sensor, analyzes these measured values and automatically determines based on the analysis whether or not a significant oscillation of the detector temperature is present. When a significant oscillation is present, the analysis unit automatically determines that the area to be monitored contains at least one combustible target gas. In the absence of a significant oscillation, the analysis unit preferably automatically determines that the area does not contain any combustible target gas.

According to the present invention, the modulator temperature oscillates, especially because of the voltage, which is applied to the modulator, which voltage is variable over time, and in addition, by the target gas being oxidized in the modulator chamber. The electrical voltage being applied can be measured and controlled. At least when no combustible target gas is present, the modulator temperature therefore oscillates in a predefined or measurable or controllable manner. An ambient temperature, at which the gas detection device according to the present invention is used, changes, as a rule, considerably more slowly than the modulator temperature. Therefore, the analysis unit is in many cases capable of distinguishing whether the detector temperature oscillates significantly or whether a change over time of the detector temperature caused in a different manner is present. In the first case, a combustible target gas is detected in the area to be monitored; in the second case, the area to be monitored does not contain a combustible target gas above a detection limit.

The gas detection device according to the present invention detects a combustible target gas with high reliability. Whether a target gas is detected or not depends on the significant oscillation and not on the position of a zero point or reference point of the detection variable, which denotes a state free from target gas above a detection limit.

Especially for this reason, since a significant oscillation can usually be reliably detected or be ruled out reliably, the gas detection device according to the present invention is relatively insensitive to fluctuations of ambient conditions, in which the gas detection device according to the present invention is used. In other words: The significant oscillation also occurs in case of varying ambient conditions, especially in case of varying ambient temperatures, especially, as a rule, when and only if a combustible target gas is present. This advantage is especially important when the gas detection device is used outside of a building and therefore the area to be monitored is exposed to weather. In many cases, the present invention spares the need to use a sensor for an ambient temperature or another ambient condition or to predefine the ambient condition of the gas detection device. Rather, the gas detection device according to the present invention also frequently yields results in a reliable manner even in case of unknown ambient conditions.

The gas detection device is capable, after a time interval has elapsed, of reliably deciding whether or not a combustible gas is present in the area. As a result, this time interval comprises only a few fluctuations of the modulator temperature, sometimes only a single fluctuation from the minimum or maximum modulator temperature and back to the minimum modulator temperature. Especially when the gas mixture diffuses or is suctioned sufficiently rapidly into the interior of the gas detection device and thus into the modulator chamber, the gas detection device according to the present invention is therefore in many cases capable of triggering an alarm fast enough and reliably enough when a combustible target gas has appeared in the area to be monitored, even though the flow and thus the flow rate into the detector chamber is limited according to the present invention.

As was already described, a target gas is detected when the analysis unit has detected a significant oscillation. A relatively low concentration of a combustible target gas in the environment of the gas detection device also leads to this significant oscillation in many cases. Therefore, the gas detection device according to the present invention is, in many cases, also capable of reliably detecting a relatively low concentration of a combustible target gas when a significant oscillation is detected. A conventional gas detection device is often not capable of detecting such a low concentration at all. The gas detection device according to the present invention hence has a lower detection limit than some conventional gas detection devices. On the other hand, the absence of a significant oscillation is a relatively more reliable proof that no combustible gas is present in the environment. The gas detection device according to the present invention therefore leads relatively rarely to false alarms, i.e., it incorrectly detects the presence of a combustible target gas in relatively few cases. The gas detection device according to the present invention is capable in a sufficiently brief time and with relatively high reliability of generating a message that the area is free from target gas.

In many cases, the detector is changed in the course of the use, especially for the following reasons: According to the present invention, current flows through the detector, as a result of which the detector component is heated. In addition, a target gas is oxidized in the environment of the detector, and the heat energy being released heats the detector from outside. Because heat energy is generated both in the detector, namely because an electrical voltage is applied and current flows, and acts on the detector from outside, namely due to the oxidation, the detector can be changed physically. This physical change may have an effect on the detection variable and thus on a signal, which is analyzed for the detection of a target gas. In addition, the gas mixture, which reaches the detector chamber through the modulator chamber, may comprise at least one substance, which chemically changes the heated detector, for example, a chemically aggressive or oxidizing or corrosive substance.

For the just mentioned reasons, the detector changes in the course of time, as a rule, chemically and often also physically. This especially chemical change may have an effect on the detection variable, which the detector sensor is capable of measuring. In particular, the causal relationship between the oxidation of the target gas and the heating of the detector can be changed over the course of time, because the detector is changed ("ages"). In addition, the maximum electrical voltage, which is applied to the detector and to the modulator, may decrease over the course of time, especially when the gas detection device has a separate voltage supply unit and thus can be used independently of a stationary power supply network.

The gas detection device according to the present invention is relatively insensitive to such an aging or other change over time of the detector, above all, because a significant oscillation can be reliably detected or reliably ruled out automatically independently of a change of the detector in many cases. In many cases, it is hence not necessary to frequently adjust the detector, even if it is changed over the course of time. This advantage is especially important when a large area shall be monitored for at least one combustible target gas by means of a plurality of gas detection devices. The present invention reduces the effort that is necessary for maintaining these gas detection devices.

One problem of many prior-art gas detection devices is that the gas detection device and especially the detector is "contaminated" over the course of time, especially since the heating of the detector and the heat energy being released during the oscillation change the detector temperature and thus the detection variable over the course of time and/or because certain target gases react chemically with the detector. The detector and the modulator of the gas detection device according to the present invention may also be increasingly "contaminated" over the course of time.

Nevertheless, the gas detection device according to the present invention has in many cases a higher resistance to gases, which may contaminate the detector and/or the modulator. This desired effect occurs especially for the following reason: The modulator is supplied with electrical voltage according to the present invention such that the modulator temperature oscillates, and especially the modulator is operated with electrical pulses (in a pulsed manner). When the modulator component is heated to a high temperature, the modulator oxidizes target gas in the modulator chamber, and less combustible target gas flows into the detector chamber, so that the detector is not exposed to the heat energy, which would otherwise be released due to the oxidation. Only if the modulator component is heated to a low temperature or the modulator is even switched off, a combustible target gas can reach the detector through the modulator chamber and be oxidized by the detector. In some cases, the switched-on and heated modulator also reduces the flow of a harmful and non-oxidized gas into the detector chamber. A possible harmful gas is thus divided into two components of the gas detection device, namely into the detector and the modulator. The detector is less exposed to harmful gases. By contrast, in case of a conventional gas detection device, the detector is continuously exposed to the target gas and continuously oxidizes the target gas.

To be sure, the modulator according to the present invention is continuously exposed to a harmful gas. However, a target gas is detected based on the significant oscillation, i.e., a detection variable not or not only because of a single value. Thanks to the present invention, a detection variable of the modulator is not necessarily measured and used for the detection. The gas detection device according to the present invention is hence less sensitive to a contamination of the modulator.

One possible corrective action to prevent the detector from being contaminated by a harmful gas is as follows: The outer fluid connection is provided with a filter, wherein this filter prevents the penetration of gases, which are harmful for the detector, into the detector chamber. The present invention makes it possible, but avoids the need, to provide the outer fluid connection and/or the inner fluid connection with a filter, which filter prevents the penetration of certain harmful gases into the modulator chamber and further into the detector chamber. One drawback of such a filter is as follows: Such a filter could lead to the detector not detecting a combustible target gas, even though this target gas is present in the environment of the gas detection device and should be detected. This undesired result may occur, because the target gas does not reach the detector chamber at all or only very slowly because of the filter.

The gas detection device according to the present invention does not require movable mechanical components, especially no oscillating mechanical components. Such a movable mechanical component inevitably closes during the operation. In particular, a bearing may close or block, wherein a mechanical component is mounted movably in this bearing. A mechanical component can be damaged, when the gas detection device is exposed to a shock or to another mechanical pulse. In addition, it is necessary to monitor a movable mechanical component in order to detect wear and failure. The gas detection device according to the present invention needs neither a movable mechanical component nor a bearing nor a sensor for monitoring a closing mechanical component and also no adjusting element for the active movement of a movable component. The gas detection device according to the present invention hence has a many cases a longer service life and/or a lower weight and/or a lower energy consumption than other gas detection devices.

The gas detection device according to the present invention does not in many cases need a pump or other delivery device, which delivers a gas mixture to be analyzed to the detector chamber. Both the outer fluid connection and the inner fluid connection may have a sufficiently large diameter, so that a gas mixture to be analyzed reaches the detector chamber rapidly and reliably solely by diffusion. This advantage is also, above all, therefore achieved, because the analysis unit detects a combustible target gas because of a significant oscillation and not by a comparison with a reference value, which is obtained for a gas mixture, which is free from a combustible target gas.

Some gas detection devices known from the state of the art comprise, in addition to the detector, a reference unit, for example, a compensator. A signal of this reference unit makes it possible to compensate by calculation the effect of ambient conditions on the detection variable up to a certain extent. During the use of such a gas detection device known from the state of the art, the detector is surrounded by a gas mixture, which may contain a combustible target gas, while the reference unit in one embodiment is surrounded by a gas mixture, which does not contain a combustible target gas. In another embodiment known from the state of the art, the reference unit is exposed to the same gas mixture as the detector, but is not capable of oxidizing a combustible target gas. Both the detector unit and the reference unit are heated, for example, by an electrical voltage being applied, and by a detection variable of the detector being compared with the corresponding detection variable of the reference unit. A significant difference indicates that a target gas is present.

Such a gas detection device with a detector and with a reference unit requires that the detector and the reference unit have a sufficiently similar configuration and the nevertheless present differences can be sufficiently easily compensated by calculation. Only then can it be reliably distinguished whether or not the gas mixture contains a combustible target gas by comparison of the values which the detection variable for the detector or for the reference unit has. The gas detection device according to the present invention may comprise a reference unit. However, the present invention spares the need to provide a reference unit, which is sufficiently similar to the detector. The object of the modulator according to the present invention is alternately to oxidize and not to oxidize target gas in the modulator chamber, so that the detector alternately does not oxidize and does oxidize this target gas. The modulator does not necessarily need to oxidize target gas in the same manner or to the same extent as the detector or to have the same thermal properties. The present invention makes it possible, but does not require, for the detection variable to be measured also for the modulator.

A modulator sensor can measure a detection variable of the modulator, which detection variable correlates with the temperature of the modulator, for example, the temperature itself or the electrical voltage that is applied to the modulator, and/or the current intensity of the current flowing through the modulator. As is known, the electrical resistance correlates with the temperature. By measured values of the detector sensor and optionally of an additional sensor, which measures a detection variable of the modulator, being analyzed, it can in many cases be determined with certainty whether an oscillation of the detector temperature is caused by a combustible target gas in the detector chamber, i.e., is a significant oscillation, or by changing ambient conditions, especially by a change in the ambient temperature, and/or by an unavoidable measurement noise or process noise. The modulator temperature ideally depends only on the electrical voltage being applied to the modulator and on the concentration of a combustible target gas; in practice, moreover, it depends on ambient conditions and on an unavoidable aging of the modulator. This applies correspondingly to the detector temperature. The measured modulator temperature can be used for compensating by calculation the effect of ambient conditions and aging on the detector temperature and thus on the detection variable in many cases. In addition, it is possible in some cases, if the detector fails to detect a combustible target gas by means of the measured modulator temperature. In this case, the modulator preferably operates like a detector of a conventional gas detection device.

According to the present invention, the electrical voltage that is applied to the modulator oscillates. In many cases, the modulator consumes less electrical energy thanks to the oscillations than when the modulator would be continuously heated to a temperature that is sufficiently high for oxidation. Compared with conventional gas detection devices, the gas detection device according to the present invention thus saves electrical energy in many cases.

If the area to be monitored contains a combustible target gas, the temperature of the detector, which is increased by the oxidation, and thus the detection variable oscillates in a significant manner. In some cases, a parameter of this oscillation differs from target gas to target gas. For example, the time course of the detector temperature and thus the time course of the detection variable or the time course in the analysis period depend in a characteristic manner on the species and/or on the concentration of the combustible target gas in a time interval, in which the modulator has a low temperature and hence is capable of oxidizing only a little target gas. Therefore, the gas detection device according to the present invention is in many cases capable of not only automatically deciding whether or not a combustible target gas is present in the area, but additionally, what species this combustible target gas is and/or in what concentration it is present. The same gas detection device according to the present invention can in some cases therefore be used for detecting different predefined target gases.

According to the present invention, an analysis period is predefined. At least in this analysis period, the temperature of the detector, which is caused by applying the voltage, does not oscillate at all or with a lower amplitude than the temperature of the modulator. The analysis unit uses measured values, which the detector sensor has generated in the analysis period, to determine about the presence or absence of the target gas. This analysis period may be identical to the entire use period, in which the gas detection device is used, or a period that is shorter than the use period. The analysis period may comprise a sequence of analysis intervals, wherein a gap and thus a time interval between two consecutive analysis intervals occurs. The embodiment comprising a plurality of analysis intervals that are spaced apart from one another saves electrical energy in many cases. The interval between two analysis intervals can be specified as a function of a desired response time of the gas detection device to a combustible target gas.

In a preferred embodiment, the detector, and especially preferably the modulator as well, is supplied with a pulsed electrical voltage. Compared with an embodiment, in which an electrical voltage is continuously applied to the detector, this embodiment saves electrical energy. The rate (frequency) and duration of the electrical pulses can be predefined such that, on the one hand, a combustible target gas is detected rapidly enough, which requires a sufficiently high pulse rate, and, on the other hand, the consumer of electrical energy is kept relatively low. The requirement to save energy is especially important when the gas detection device comprises a separate voltage supply unit and is not at all connected or is not continuously connected to a stationary voltage supply network. The electrical pulses of the electrical voltage being applied to the detector preferably have a lower amplitude and preferably also a lower rate than the pulses of the electrical voltage being applied to the modulator.

If the voltage is applied to the detector as electrical pulses (in a pulsed manner), then a sequence of time intervals, in which the electrical voltage being applied is above an absolute or relative limit, is preferably selected as the analysis period. The analysis unit preferably takes into consideration a measured value of the detector sensor only if this measured value has been generated in a time period with a voltage above the limit.

According to the present invention, the modulator chamber encloses the modulator and the detector chamber encloses the detector. The two chambers reduce the risk that the heated modulator or the heated detector ignites a combustible target gas outside the gas detection device or even brings it to explosion, which is, as a rule, undesired and frequently even dangerous. Conversely, the chambers protect the modulator and the detector against undesired mechanical and chemical environmental effects. The outer fluid connection is preferably provided with a flame arrester or another flame protection, so that the risk that flames will shoot outwards from the modulator chamber is reduced.

According to the present invention, the modulator chamber encloses the modulator and has the outer fluid connection. In one embodiment the modulator chamber separates the modulator in a gas-tight manner from the environment, except for the outer fluid connection. The detector chamber encloses the detector in a gas-tight manner, except for the inner fluid connection. This embodiment further reduces the risk for the undesired event that a large quantity of a gas mixture with a combustible target gas bypasses the modulator and reaches the detector chamber, without the heated modulator being able to oxidize the target gas. If target gas bypasses the modulator, the gas detection device could obtain incorrect detection results.

According to the present invention, an electrical voltage is applied to the modulator such that the temperature of the modulator oscillates. In one embodiment, the modulator temperature alternates between a lower temperature value and a higher temperature value, and preferably in the form of a rectangular time course. The low temperature value is achieved, for example, by a voltage-free state.

In a preferred embodiment, a desired or required time course of the modulator temperature, for example, a rectangular curve is predefined. A modulator temperature sensor repeatedly measures an indicator of the actual current modulator temperature. For example, the modulator temperature sensor directly measures the modulator temperature or even the electrical resistance of the modulator. A signal-processing control device automatically controls the modulator temperature. The predefined desired time course of the indicator of the modulator temperature is the command variable, and the measured actual time course of the indicator of the modulator temperature is the controlled variable during this closed-loop control. The electrical voltage, which is applied to the modulator and which is variable, preferably acts as the manipulated variable or a manipulated variable of the control. The control device changes this voltage. Also, the electrical current intensity or another variable and controllable electrical variable may act as a manipulated variable. The concentration of a combustible target gas as well as the ambient conditions are possible disturbance variables for this closed-loop control.

This embodiment that the modulator temperature is controlled leads to the thermal behavior and the thermal balance of the modulator depending essentially on the predefined time course of the desired or required modulator temperature and on the concentration of combustible target gas in the area to be monitored or in the modulator chamber only to a relatively little extent. This embodiment makes it easier to configure the gas detection device and to predict its service life.

In the just described embodiment, the temperature of the modulator is used as a controllable variable. Instead of the temperature, a different controllable variable may also be used, which correlates with the temperature and which is measured by a modulator controllable variable sensor, for example

- the electrical resistance of the modulator, which, as is known, depends on the temperature,
- the intensity of the electric current, which flows through the modulator,
- the electrical voltage that is applied to the modulator, or
- the electrical power consumed by the modulator.

In these embodiments as well, the electrical voltage is preferably used as the manipulated variable, i.e., the electrical voltage being applied to the modulator is controlled with the control gain that the controllable variable of the modulator follows a desired time course. It is also possible to use the intensity of the current flowing through the modulator as the manipulated variable.

According to the present invention, an electrical voltage is applied to the detector. The application of this voltage brings about a flow of electric current through the detector and the detector component is heated. The temperature, which is caused by the voltage being applied, oscillates according to the present invention with lower amplitude than the modulator temperature, optionally not at all. The detector temperature is influenced, on the one hand, by the electric current, which flows through the detector, and, on the other hand, by the oxidation of combustible target gas in the detector chamber.

In a preferred embodiment, a desired or required time course of the current intensity of the current flowing through the detector is predefined. A current intensity sensor repeatedly measures the actual current intensity. A control device controls the current intensity of the current flowing through the detector. The predefined desired time course of the current intensity is the reference variable and the measured time course of the actual current intensity is the controlled variable during this closed-loop control. The electrical voltage, which is applied to the detector and which is variable over time, acts preferably as the manipulated variable or as a manipulated variable. The control device changes this electrical voltage being applied. In turn, the concentration of a combustible target gas and ambient conditions are possible disturbance variables.

This embodiment increases the reliability, with which the presence of a combustible target gas is reliably distinguished from the absence thereof. If no combustible target gas is present in the area to be monitored and therefore also no combustible target gas reaches the detector chamber, the time course of the actual detector temperature essentially depends on the time course of the current intensity of the current flowing through the detector and on the voltage being applied. Due to the control this current intensity time course and this voltage time course are known sufficiently accurately. Due to the construction of the detector, especially due to the electrical resistance thereof, it is in many cases also sufficiently accurately known what time course the detector temperature has, if no combustible target gas is present in the detector chamber. A target gas is present if the following event is detected: The detector temperature and thus the detection variable oscillate, and this oscillation differs significantly from the time course of the effect, which the electric current flowing through the detector has on the detector temperature.

As just described, a desired or required time course of the current intensity is predefined in one configuration. One embodiment of this configuration is the specification that this current intensity shall remain constant over time. The control is thus carried out with the target that the current intensity of the current flowing through the detector shall remain constant over time. The oxidation of combustible target gas in the detector chamber changes in many cases the electrical resistance of the detector. As is known, the electrical resistance of many metals, e.g., platinum, increases with the temperature. This effect is compensated by a closed-loop control of the current intensity being carried out and the electrical voltage being applied being changed, as needed. If the detector temperature and thus the detection variable oscillates despite the control, then at least one combustible target gas was detected with relatively high reliability in the detector chamber and thus in the area to be monitored.

In the just described configuration, the current intensity acts as the controllable variable of the detector. It is also possible to control a different variable of the detector, which correlates with the temperature and which is different from the detection variable, for example, one of the following variables:
the electrical voltage being applied to the detector,
the electrical resistance of the detector,
the electrical power consumed by the detector,
directly the temperature of the detector.

A detector controllable variable sensor measures this variable, which correlates with the temperature and which is controlled. In these embodiments as well, the electrical voltage is preferably used as the manipulated variable, i.e., the electrical voltage being applied to the detector is changed with the control target that the controllable variable of the detector follows a desired time course. Of course, this applies only if the electrical voltage being applied is not the detection variable. It is also possible to use the intensity of the current flowing through the detector as the manipulated variable.

In many cases, the knowledge of a so-called zero point of the detector is desired. This zero point is the current value of the detection variable in a situation, in which no target gas is oxidized in the detector chamber. Because the detector is changed due to aging in the course of the time and the ambient conditions may also be variable, the detector zero point drifts, as a rule, over the course of time, i.e., does not remain constant. One embodiment of the present invention makes it possible to determine the zero point automatically, namely preferably again during each measuring cycle. As a result, the zero point is automatically updated, even in case of a gradual change of the detector.

According to this embodiment, an electrical voltage is applied to the modulator such that the actual modulator temperature oscillates between a minimum temperature value and a maximum temperature value, for example, with a rectangular or triangular or sinusoidal curve. The just described control of the modulator temperature or of another controllable modulator variable is preferably carried out. The maximum temperature value and the time interval, in which the modulator has a temperature above a predefined temperature limit, are preferably predefined such that the modulator, when it has the maximum temperature value, practically oxidizes the entire combustible target gas in the modulator chamber with high reliability. In this time interval, practically no combustible target gas reaches the detector chamber. Therefore, heat energy cannot be released in the detector chamber due to an oxidation of a combustible target gas, namely, not even if the area to be monitored contains a combustible target gas. In this time interval, in which the detector chamber is free from a combustible target gas, the detector sensor or a detector sensor measures the detection variable at least once. The value of the detection variable measured in this time interval is used as the zero point sought.

This embodiment to specify the zero point spares the need to establish and then to measure a state free from a target gas in an area outside of the gas detection device. The zero point can rather be specified independently of the concentration of a combustible target gas in the area to be monitored, since the modulator brings about that no combustible target gas is present in the detector chamber.

In a preferred embodiment, both the detector and the modulator comprise each
a wire made of an electrically conductive material, especially made of platinum or made of an alloy, which contains platinum, wherein this wire acts as the heated component,
an insulation, which insulates the wire electrically, but not thermally, especially an insulation in the form of a ceramic jacketing, and
a catalytic material inside or outside on the electrical insulation, especially a coating of the outer surface of the insulation consisting of a catalytic material and/or a catalytic material, which is embedded in the insulation.

The electrically conductive wire comprises a heating segment, for example, a coil made of wound-up wire. This heating segment is heated when an electrical voltage is applied to the wire and hence current flows through the wire. The electrical insulation of the wire is preferably made of a ceramic material and has, for example, the shape of a sphere or an ellipsoid. This may apply to the wire of the detector and/or to the wire of the modulator.

Both the detector and the modulator are each especially preferably configured as a pellistor.

In many cases it is possible thanks to the catalytic material to operate the detector and the modulator with a lower temperature than in a conceivable embodiment without catalytic material. Despite the lower temperature, a combustible target gas is oxidized thanks to the catalytic material. Thanks to the lower temperature, the target gas is oxidized in many cases, without burning or even exploding, and electrical energy is saved. At a very high concentration of combustible target gas, however, a target gas can burn or even explode with open flame, even though the detector and/or the modulator contain ceramic material.

The gas detection device according to the present invention may be configured as a stationary device or even as a portable device. In one embodiment, the gas detection device has a separate voltage supply unit and is thus independent of a stationary voltage supply network. In one embodiment, the gas detection device according to the present invention can be attached to the clothing of a person or can be carried in a hand and then warns this person against combustible target gas. This gas detection device preferably outputs an alarm in a form perceptible by a person, when a combustible target gas is detected, for example, visually and/or acoustically and/or by touch, namely by vibrations being generated. In one embodiment, the gas detection device transmits an alarm to a receiver located at a distance in space that a combustible target gas is detected, and/or a message that the presence of combustible target gas can be ruled out.

The present invention will be described below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4a is a schematic view showing an exemplary control of the detector current intensity;

FIG. 4b is a schematic view showing an exemplary control of the modulator temperature;

DESCRIPTION OF PREFERRED EMBODIMENTS

Figure 1:
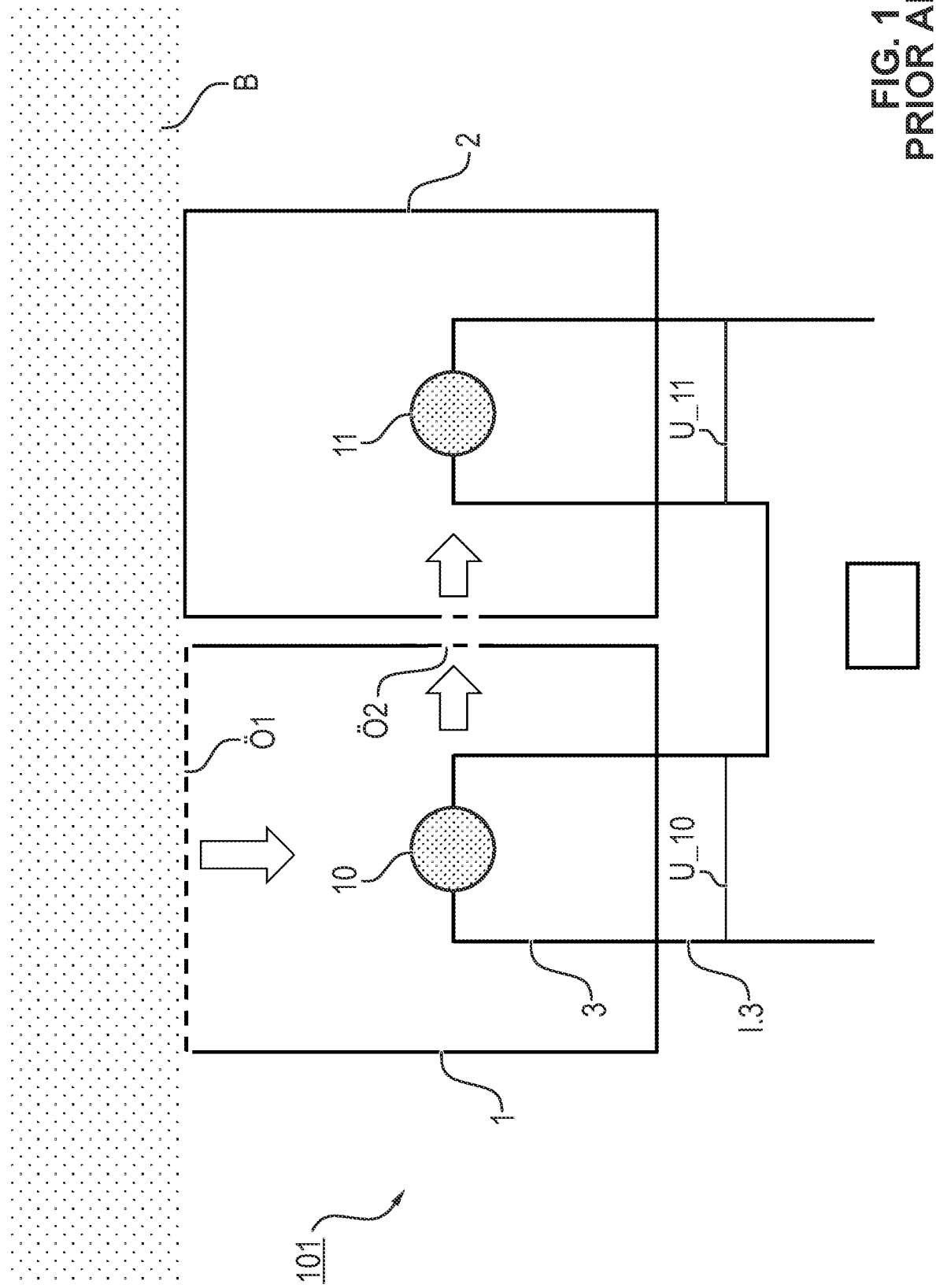
FIG. 1 is a schematic view showing a gas detection device known from the state of the art with a detector and with a compensator.

Referring to the drawings, in the exemplary embodiment, the gas detection device according to the present invention is used to detect a predefined combustible gas, for example, methane ($CH_4$). This combustible gas is called "target gas" below. Of course, the gas detection device shall not trigger an explosion or a fire. The gas detection device of the exemplary embodiment is preferably approved as an explosion-proof device and may hence also be used in a potentially explosive environment, for example, in a mine or a refinery or a warehouse.

FIG. 1 schematically shows a gas detection device 101, which is known from the state of the art, for example, from DE 10 2017 005 713 A1, and can be called a heat tone sensor. A combustible target gas may appear in an area B to be monitored. This gas detection device 101 comprises
  a detector chamber 1 with an outer opening Ö1,
  a compensator chamber 2,
  an inner opening Ö2 between the detector chamber 1 and the compensator chamber 2,
  a detector 10 in the detector chamber 1,
  a compensator (reference unit) 11 in the compensator chamber 2,
  an electrical line 3, which connects the detector 10 and the compensator 11 to a current source, not shown, and
  a data-processing analysis unit.

The detector chamber 1 is in a fluid connection with the environment via the outer opening Ö1. The compensator chamber 2 encloses the compensator 11 entirely, except for the inner opening Ö2. A gas in the area B can only flow through the inner opening Ö2 into the compensator chamber 2.

A stable inner housing, not shown, encloses the detector chamber 1 and the compensator chamber 2. As an alternative, a respective inner housing encloses the detector chamber 1 and the compensator chamber 2. The current source, the analysis unit and other components of the gas detection device 101 are located outside of the inner housing or of each inner housing and inside of an outer housing.

The detector 10 and the compensator 11 are connected in series. The line 3, the detector 10 and the compensator 11 may be components of a Wheatstone measuring bridge.

Furthermore, the current intensity I.3 in the line 3, the detector voltage U_10, which is applied to the detector 10, as well as the compensator voltage U_11, which is applied to the compensator 11, are indicated.

The electric current, which flows through the line 3, brings about that the detector 10 and the compensator 11 are heated, namely as a function of the current intensity I.3. The heating of the detector 10 brings about an oxidation of a target gas to be detected in the detector chamber 1 and heat energy is released as a result. As a result, the target gas is heated, namely as a function of the current intensity I.3. This heating of the target gas induces a further heating of the detector 10. The temperature of the detector 10 thus increases, namely as a function of the heating of the target gas. A sensor, not shown in FIG. 1, measures a detection variable, for example, the detector temperature, which increases due to the oxidation, or a parameter correlating with the detector temperature.

The electric current flowing through the line 3 brings about, in addition, a heating of the compensator 11. The compensator 11 is, however, not heated by combustible target gas in the area B. By contrast, variable ambient conditions, especially a variable ambient temperature, act both on the detector 10 and on the compensator 11. A sensor, not shown, measures the corresponding detection variable of the compensator 11.

The data-processing analysis unit receives measured values from sensors, which measure the detection variable for the detector 10 and the detection variable for the compensator 11. These sensors are not shown in FIG. 1. A significant deviation of the measured values for the detection variable shows the presence of the target gas. The absence of a significant deviation shows that no combustible target gas is present in the environment of the gas detection device 100; more generally: that the concentration of combustible target gas is below a detection limit.

In the arrangement shown in FIG. 1, the detector 10 oxidizes a large part of the target gas, if such a target gas is present in the detector chamber 1. The gas, which reaches the compensator chamber 2 through the opening Ö2, has in one embodiment a markedly lower concentration of target gases. Ideally, it is free from target gas. In another embodiment, the compensator 11 is not capable of oxidizing a combustible target gas.

Both the detector 10 and the compensator 11 are preferably configured as so-called pellistors. Pellistors can also be used for the present invention.

A pellistor comprises small pellets made of a ceramic material which is optionally interspersed with a catalyst. The pellistor preferably comprises a wire made of an electrically conductive material, especially preferably made of platinum, which is led through the ceramic material. The pellistor 10, 11 preferably comprises an electrically conductive wire comprising a coil with turns, wherein the wire is led through the interior of the ceramic and the coil is embedded in the ceramic. An electrical voltage is applied to the wire in the ceramic material. The ceramic material insulates the wire electrically and prevents an undesired short circuit.

The operating temperature of the heated wire alone is not sufficient in many cases to oxidize a target gas. The catalytic material in or on the ceramic brings about that a combustible gas is oxidized and contributes in many cases to a combustible target gas being oxidized catalytically and not oxidized in a different manner, especially to not being burned. A pellistor without catalytic material is in many cases not capable of oxidizing a combustible target gas or only at an undesired high operating temperature.

The electrical resistance of a pellistor is changed as a function of its own temperature and thus also as a function of the temperature of the surrounding target gas, even if this surrounding air is free from target gas. As a result, the electrical resistance increases with increasing temperature, wherein a linear course can frequently be assumed. On the other hand, the temperature of the pellistor is changed as a function of the electrical voltage being applied, which a heating of the wire brings about.

In one embodiment of FIG. 1, a catalytic material is embedded in the ceramic of the detector 10, but not in the ceramic of the compensator 11. The current, which flows with the current intensity I in the line 3, heats the pellistors 10 (detector) and 11 (compensator), which are connected in series, to an operating temperature, which is, for example, between 400° C. and 500° C. Both the detector 10 and the compensator 11 were heated by the electric current. Because of the catalytic material, the detector 10 is capable of oxidizing the combustible target gas in the detector chamber 1. The heat energy, which is released during the oxidation of the target gas, changes the temperature of the detector 10. The compensator 11 changes its temperature, by contrast, only because of changed ambient conditions. The temperature of the ambient air has an effect on the temperature of both pellistors 10 and 11. This temperature change brings about that the respective electrical resistance of the pellistors 10 and 11 changes. This change of the electrical resistance brings about a change of the electrical voltage being applied to the pellistor 10 or 11 and/or of the current intensity. Both the electrical resistance and the electrical voltage and current intensity thus correlate with the presence of a combustible target gas. In one embodiment, the difference is formed from the temperature of the detector 10 and the temperature of the compensator 11. This temperature difference is an indicator of the concentration of combustible target gas.

Figure 2:
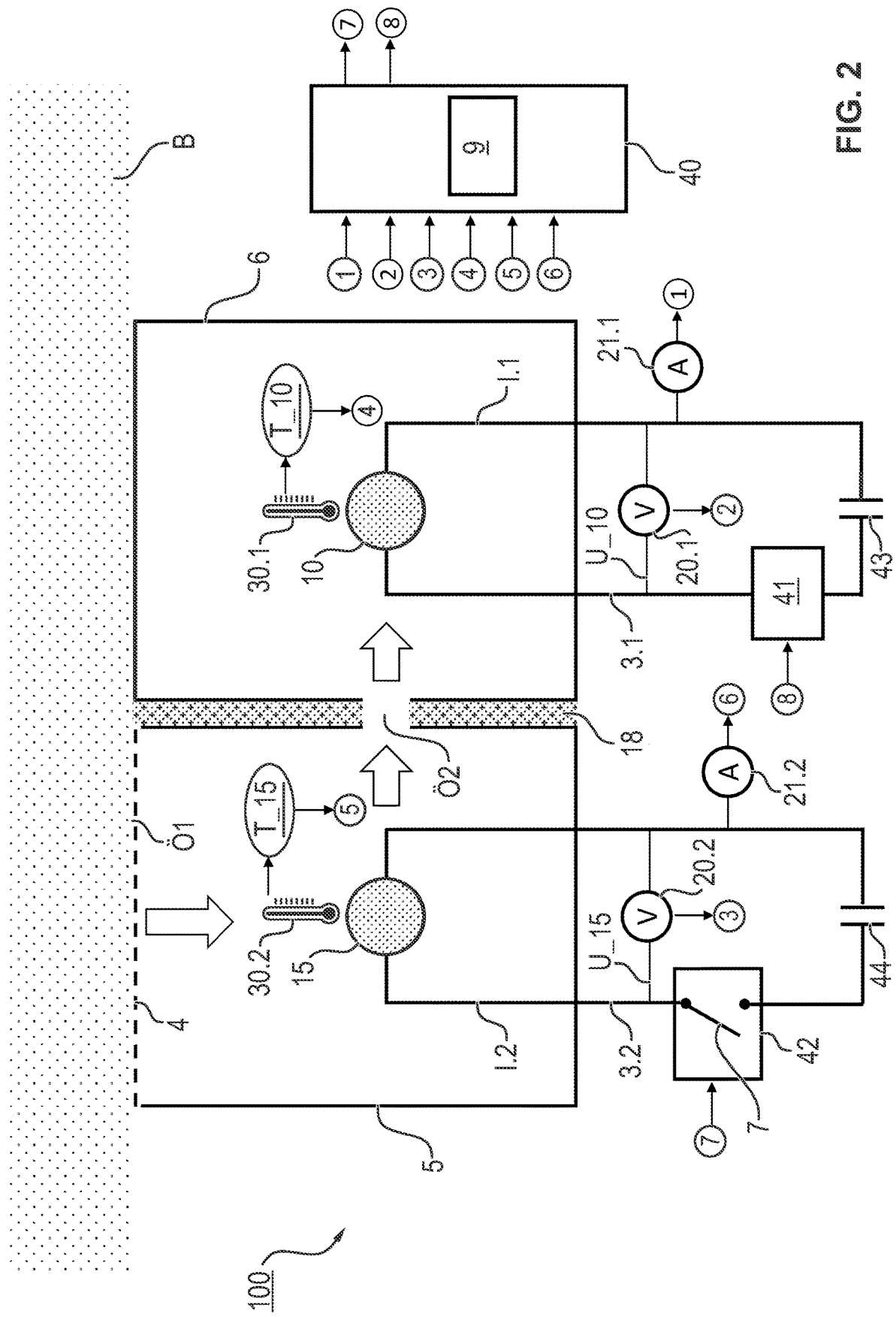
FIG. 2 is a schematic view showing an embodiment of the gas detection device according to the present invention with a detector and with a modulator.

FIG. 2 shows the principle configuration of an embodiment of the gas detection device 100 according to the present invention. Identical components have the same reference numbers as in FIG. 1.

The gas detection device 100 according to FIG. 2 likewise has two chambers, namely a modulator chamber 5 and a detector chamber 6. The modulator chamber 5 may be configured just like the detector chamber 1 from FIG. 1, and the detector chamber 6 may be configured just like the compensator chamber 2. The modulator chamber 5 and the detector chamber 6 are enclosed by a single, stable, inner housing or a respective stable inner housing, which is not shown in FIG. 2. The gas detection device 100 likewise comprises an outer housing.

The modulator chamber 5 is in an outer fluid connection with the area B to be monitored via the outer opening Ö1. In one embodiment, the outer opening Ö1 occupies the entire area of a side of the modulator chamber 5. Except for the outer opening Ö1, the modulator chamber encloses the modulator 15 entirely and in a gas-tight manner.

In FIG. 2 the outer opening Ö1 is arranged at the top of the modulator chamber 5. A mechanical grille preferably protects the modulator chamber 5 against mechanical effects. By contrast, in another embodiment, the outer opening Ö1 points downwards at right angles or obliquely, so that the risk that rain or dust particles or other rigid objects can reach the modulator chamber 5 is reduced. Rain and rigid objects can therefore not significantly distort the measurement results.

An explosion protection grille 4 consisting of a wire mesh or a filter material, for example, of a sintered material, preferably prevents flames from being released from the modulator chamber 5 through the outer opening Ö1. A gas-permeable particle filter, in one embodiment, prevents particles from reaching the modulator chamber 5. In one preferred embodiment, any combustible target gas can reach the modulator chamber 5 and the detector chamber 6 through the opening Ö2, because no gas filter filters out this target gas.

The detector chamber 6 is in an inner fluid connection with the modulator chamber 5 via an inner opening Ö2. Except for the inner opening Ö2 the detector chamber 6 of the exemplary embodiment is sealed in a gas-tight manner against the environment. Gas from the area B can therefore only flow through the outer opening Ö1, the modulator chamber 5 and the inner opening Ö2 into the detector chamber 6, but not directly from the area B into the detector chamber 6.

A thermal barrier 18, which is schematically indicated in FIG. 2, is preferably located between the modulator chamber 5 and the detector chamber 6. Thanks to the thermal barrier 18, the detector chamber 6 is thermally insulated from the modulator chamber 5 up to a certain extent. Thanks to the thermal insulation brought about, the temperature of the modulator 15 has an effect on the temperature of the detector 10 only to a relatively little extent.

The detector 10 and the modulator 15 are preferably also configured as pellistors in the exemplary embodiment. They may especially be configured as this was described for the detector 10 with reference to FIG. 1. The modulator 15 also has catalytic material in the ceramic layer and is capable of oxidizing target gas and of burning during the oxidation. Thus, the present invention spares the need to have to provide two different pellistors, namely a pellistor with catalytic material and a pellistor without catalytic material in the ceramic layer.

Figure 3:
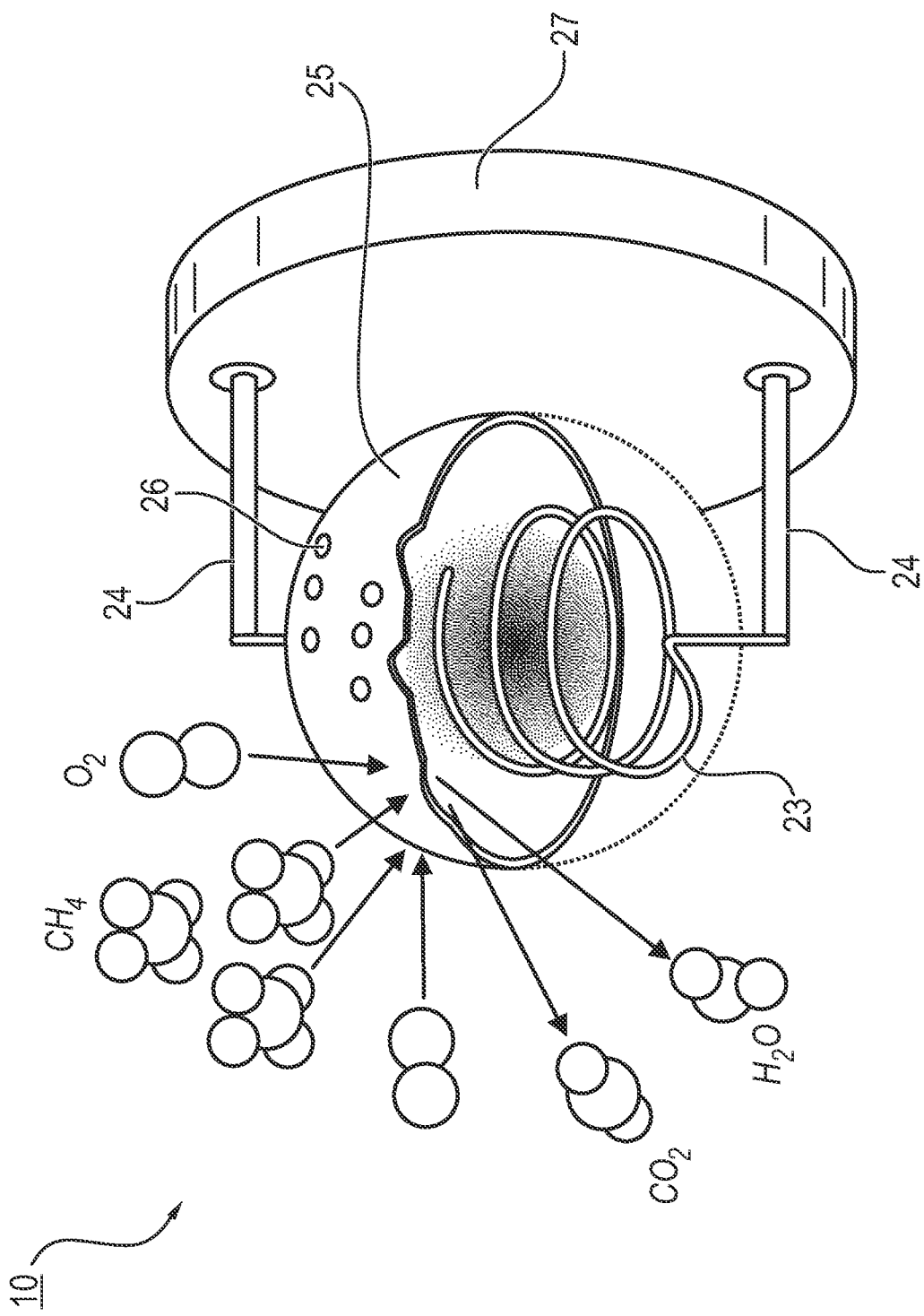
FIG. 3 is a schematic view showing an exemplary configuration of a detector configured as a pellistor.

FIG. 3 shows, as an example, the configuration of the detector 10, which is configured as a pellistor. The modulator 15 may have a similar configuration, but does not necessarily need to have the same electrical and thermal properties as the detector 10. The detector 10 according to FIG. 3 comprises a wire made of an electrically conductive material, preferably made of platinum. This wire comprises a helical heating segment 23, i.e., a coil, as well as two electrical connections 24 for this heating segment 23. Two mechanical brackets hold the two electrical connections 24. The detector 10 comprises, furthermore,

- an electrical insulation in the form of a jacketing 25 around the heating segment 23, which jacketing 25 is made of a ceramic material, wherein the jacketing 25 encloses entirely the heating segment 23 and wherein the jacketing 25 is ideally in planar contact with the entire length of the heating segment 23,
- a coating of the outer surface of the ceramic jacketing 25, which consists of a catalytic material and is indicated by circles 26, and
- a mounting plate 27.

The electrical insulation 25 prevents the coil 23 from becoming short-circuited and ensures a sufficient mechanical stability. The electrical insulation 25 establishes a thermal contact between the heating segment 23 and the coating 26. On the one hand, the heating segment 23, through which current flows and which is heated, brings about that a target gas is oxidized thanks to the thermal contact. On the other hand, the heat energy, which is released during the oxidation, acts on the heating segment 23 thanks to the thermal contact and heats this heating segment 23 further.

The coating 26 consisting of the catalytic material is preferably configured such that the spherical detector 10 has a porous surface. As a result, the surface of the detector 10 is greater compared with a smooth surface. In addition, a gas mixture penetrates in deeper layers of the jacketing 25. The enlarged surface and the penetration of the gas mixture improve the oxidation of the burning target gas. The porous structure of the detector is also maintained during the oxidation of the target gas, which is brought about by the electrical insulation of the heating segment 23 consisting of the ceramic material. The jacketing 25 preferably has the shape of a full sphere, wherein individual bubbles may be located in the interior of this full sphere, which bubbles were produced during the manufacture.

As is indicated in FIG. 3, the detector 10 brings about an oxidation of the target gas, methane ($CH_4$) here as an example. In this case, $CH_4$ and $O_2$ are converted into $H_2O$ and $CO_2$. Heat energy is released during this oxidation.

However, thanks to the present invention, it is not absolutely necessarily possible that the two pellistors 10, 15 change their electrical properties in the same manner as a function of the temperature. The dispensing with this requirement, which is often difficult to observe in practice, results from a different mode of operation, which will be described below. The detector 10 is configured in one embodiment like the measuring element 130 or 330 from DE 10 2017 011 530 A1 (corresponding US2019178827 A1 is incorporated herein by reference).

The electrical line 3.1 from FIG. 2 connects the detector 10 to a schematically shown voltage source 43. The electrical line 3.2 connects the modulator 15 to a schematically shown voltage source 44. These voltage sources 43, 44 may be provided by a stationary voltage supply network. It is also possible that the voltage sources 43, 44 are each a local voltage supply unit, for example, a battery or a storage battery.

The modulator 15 and the detector 10 are connected electrically in the exemplary embodiment such that a respective electrical voltage can be applied to the modulator and detector independently of one another. The modulator 15 and the detector 10 are thus not connected in series. Therefore, in the exemplary embodiment, the voltage U_15, which is applied to the modulator 15, can be changed independently of the voltage U_10, which is applied to the detector 10.

A schematically shown voltage change unit 42 is capable of changing the voltage U that is applied to the modulator 15. This voltage change unit 42 can preferably be actuated from outside and changes the voltage U_15 such that this voltage ideally follows a predefined curve (predetermined time course) and oscillates in this case. The electrical voltage U_15 is preferably applied as electrical pulses (in a pulsed manner). In a simple embodiment of this pulsing, a switch 7 of the voltage change unit 42, which switch can be actuated from outside, is capable of selectively interrupting or activating the electrical line 3.2. Depending on the position of the switch 7, the modulator 15 is supplied with current or is not supplied with current.

In the simple embodiment shown, the voltage U_15, which is applied to the modulator 15, remains constant over time. In a more general embodiment, a voltage controller of the voltage change unit 42 can be actuated from outside in order to change the voltage U_15 being applied.

A voltage change unit 41 is capable of changing the electrical voltage U_10, which is applied to the detector 10.

It is possible that the electrical voltage U_15, which is applied to the modulator 15, oscillates, and especially has a rectangular time course, i.e., it jumps back and forth between two values. The voltage U_10, which is applied to the detector 10, is in one embodiment also variable over time, namely by means of the voltage change unit 41. Two other variant preferred embodiments are explained farther below with reference to FIG. 4.

In the exemplary embodiment according to FIG. 2, the gas detection device 100 according to the present invention comprises the following sensors:
- a voltage sensor 20.1, which measures the electrical voltage U_10 currently being applied to the detector 10,
- a voltage sensor 20.2, which measures the electrical voltage U_15 currently being applied to the modulator 15,
- a current intensity sensor 21.1, which measures the current intensity I.1 of the electric current flowing through the detector 10,
- a current intensity sensor 21.2, which measures the current intensity I.2 of the electric current flowing through the modulator 15,
- optionally a temperature sensor 30.1, which measures an indicator of the current temperature T_10 of the detector 10, for example, directly measures the temperature, and
- optionally a temperature sensor 30.2, which measures an indicator of the current temperature T_15 of the modulator 15, for example, directly measures the temperature.

The voltage sensor 20.1, the current intensity sensor 21.1 and the temperature sensor 30.1 comprise a detector sensor arrangement. The voltage sensor 20.2, the current intensity sensor 21.2 and the temperature sensor 30.2 comprise a modulator sensor arrangement.

In a preferred embodiment, an analysis unit 9, comprising one or more processors and a memory, receives measured values from the voltage sensor 20.1 and from the current intensity sensor 21.1 and calculates the actual value of the electrical resistance of the detector 10 from the voltage U_10 and from the current intensity I.1 of the detector 10. As is known, in many situations the temperature of a metallic component, through which current flows, correlates with its electrical resistance such that the higher the temperature is, the greater is the electrical resistance. In many cases, the parameters of the detector 10, which have an effect on the dependence between the temperature and the electrical resistance, are sufficiently accurately known because of the construction of the detector 10. According to a preferred embodiment, the analysis unit 9 calculates the temperature T_10 of the detector 10 from the voltage U_10 and from the current intensity I.1. In this embodiment, the temperature T_10 of the detector 10 acts as the detection variable, which is influenced by the oxidation of a target gas in the detector chamber 6.

In another embodiment, the voltage U_10 being applied to the detector 10 acts as the detection variable. If the current intensity I.1 of the current flowing through the detector 10 is known, then the voltage U_10 being applied is an indicator of the electrical resistance and thus an indicator of the temperature T_10 of the detector 10 and thus also an indicator of the heat energy, which is released during the oxidation of a combustible target gas. This embodiment spares the need to measure or to calculate the temperature T_10 directly, i.e., it spares a temperature sensor 30.1.

Correspondingly, the analysis unit 9 receives measured values from the voltage sensor 20.2 and from the current intensity sensor 21.2, calculates the current value of the electrical resistance of the modulator 15 and derives from same the current temperature T_15 of the modulator 15.

The analysis unit 9 is preferably in a data connection with a receiver, for example, with a center located at a distance in space. If the analysis unit 9 has detected a combustible target gas, then the analysis unit 9 triggers the step that a message is transmitted to the receiver and an output unit of the receiver outputs an alarm in a form perceptible by a person. In another embodiment, the gas detection device 100 comprises an alarm unit, which then outputs an alarm in a form perceptible by a person, when a combustible target gas is detected.

The gas detection device 100 from FIG. 2 comprises, furthermore, a data-processing control device 40, which comprises the analysis unit 9. This control device 40 preferably carries out an automatic closed-loop control for the detector 10 and an automatic control for the modulator 15. A controllable variable of the detector 10 or of the modulator 15 is the respective controlled variable of this control. The controllable variable of the detector 10 has an effect on the detection variable, and especially the temperature T_10 or the electrical voltage U_10. The controllable variable of the modulator 15 has an effect on the operation that the modulator 15 oxidizes combustible target gas.

A respective desired or required time course of this controlled variable is predefined and acts as the reference variable. The control target is that the actual time course of the controlled variable, i.e., the controllable variable, follows the predefined time course. The manipulated variable of this control in the example shown is the voltage U_10 being applied to the detector 10 or the voltage U_15 being applied to the modulator 15. The control device 40 actuates the two voltage change units 41 and 42 in order to change the voltage U_10 and U_15 and as a result to bring about that the respective controlled variable follows the predefined reference variable.

It is possible that a first reference variable and thus a first controlled variable is used for the detector 10 and a second reference variable and thus a second controlled variable is used for the modulator 15.

In one modulator, the actual temperature T_15 of the modulator 15 is used as a controlled variable for the modulator 15. This actual temperature T_15 is measured directly, for example, by the temperature sensor 30.2, or indirectly, by the electrical resistance of the modulator 15 being derived from the voltage U_15 and from the current intensity I.2 and the temperature T_15 being derived from the electrical resistance.

The gas detection device 100 applies a predefined functional relationship, especially a characteristic curve, between the temperature and the electrical resistance. In one embodiment, this functional relationship is predefined and is stored in a memory of the gas detection device 100. In another embodiment, a predefined temperature of the modulator 15 is set during a previous adjustment, and the electrical resistance that the modulator 15 has at this temperature is measured. This adjustment yields a reference point of the characteristic curve. This adjustment is carried out again as needed. The gas detection device 10 uses this reference point as well as a stored, computer-analyzable calculation rule to determine the respective temperature for other values of the electrical resistance.

The predefined desired temperature T_15 of the modulator 15 shall oscillate and has, for example, a rectangular time course, i.e., the temperature jumps back and forth between two different values. At the higher temperature value, the modulator 15 oxidizes a greater quantity of the target gas in the modulator chamber 5, provided that combustible target gas is present in the modulator chamber 5.

In one embodiment, the current intensity I.1 of the current, which flows through the detector 10, is used as a controlled variable for the detector 10. Because the temperature of the gas in the detector chamber 6 and as a result also the temperature T_10 of the detector 10 may be variable over time and because the temperature T_10 of the detector 10 has an effect on the electrical resistance thereof, the voltage U_10 being applied to the detector 10 is the manipulated variable and is controlled with the target that the current intensity I.1 follows a predefined time course I.1_soll, especially that it remains constant.

FIG. 4a shows, as an example, how the control device 40 controls the current intensity I.1 of the current I.1, which flows through the detector 10. FIG. 4b shows, as an example, how the control device 40 controls the temperature T_15 of the modulator 15. In these schematic views, the reference numbers have the same meanings as in FIG. 2. In addition, I.1_soll denotes a predefined time course of the desired or required current intensity I.1, especially a predefined value, ΔI.1 denotes the deviation between the desired current intensity I.1_soll and the measured current intensity I.1, T_15_soll denotes a predefined time course of the desired or required modulator temperature T_15, and ΔT_15 denotes a deviation between the desired modulator temperature T_15_soll and the measured modulator temperature T_15.

In the example shown, the current intensity I.1 through the detector 10 as well as the temperature T_15 of the modulator 15 are controlled. It is also possible to control the following variables for the detector 10 and/or for the modulator 15, wherein the same variables or different variables for the detector 10 and for the modulator 15 can be controlled:

the intensity I.1, I.2 of the current, which flows through the detector 10 or through the modulator 15, the voltage U_10, U_15, which is applied to the detector 10 or to the modulator 15, the electrical resistance of the detector 10 or of the modulator 15, which, as is known, depends on the temperature T_10 or T_15, directly the temperature T_10, T_15 of the detector 10 or of the modulator 15, the electrical power consumed by the detector 10 or by the modulator 15, which, as is known, depends on the electrical resistance and thus on the temperature T_10 or T_15.

As already mentioned, the detector 10 is capable of oxidizing a combustible target gas, which is located in the detector chamber 6. The oxidation of the target gas changes the temperature in the detector chamber 6 and also the temperature T_10 of the detector 10. This temperature T_10 is measured directly or indirectly, as described above. The more intensely the detector 10 is heated, the higher is the concentration of the target gas in the detector chamber 6. Hence, the measured temperature T_10 of the detector 10 correlates with the sought concentration, especially with the presence or absence of the combustible target gas in the detector chamber 6.

In a possible implementation of the embodiment being shown, the temperature sensor 30.1 directly measures the temperature T_10 of the detector 10. The measured temperature T_10 is transmitted to the analysis unit 9. It is possible that the measured voltage U_10, which is applied to the detector 10, as well as the measured current intensity I.1 of the current flowing through the detector 10 are additionally measured. The current electrical resistance of the detector 10 is derived from the voltage U_10 and from the current intensity I.1. The electrical resistance of the detector 10 is variable over time and correlates with the temperature T_10 thereof. The two just described configurations, namely, on the one hand, to measure the temperature T_10 directly and, on the other hand, to derive the electrical resistance and the temperature T_10 from the electrical resistance, can be combined. This combination increases the reliability of the detection and often makes it possible to provide a gas detection device with redundancy. It is also possible to use the electrical voltage U_10 as a detection variable.

Figure 5:
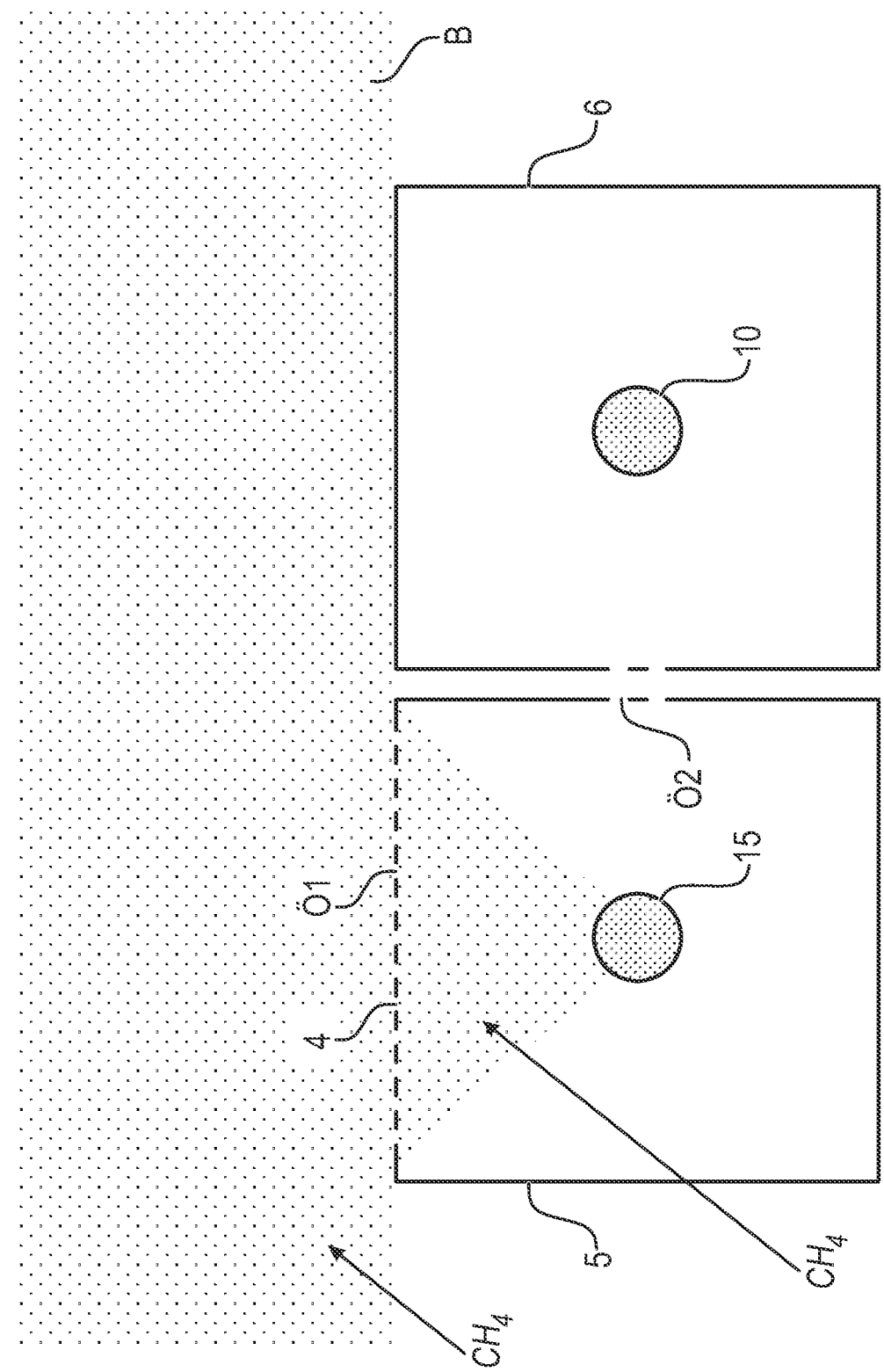
FIG. 5 is a schematic view showing the gas detection device from FIG. 2, with the modulator activated.
Figure 6:
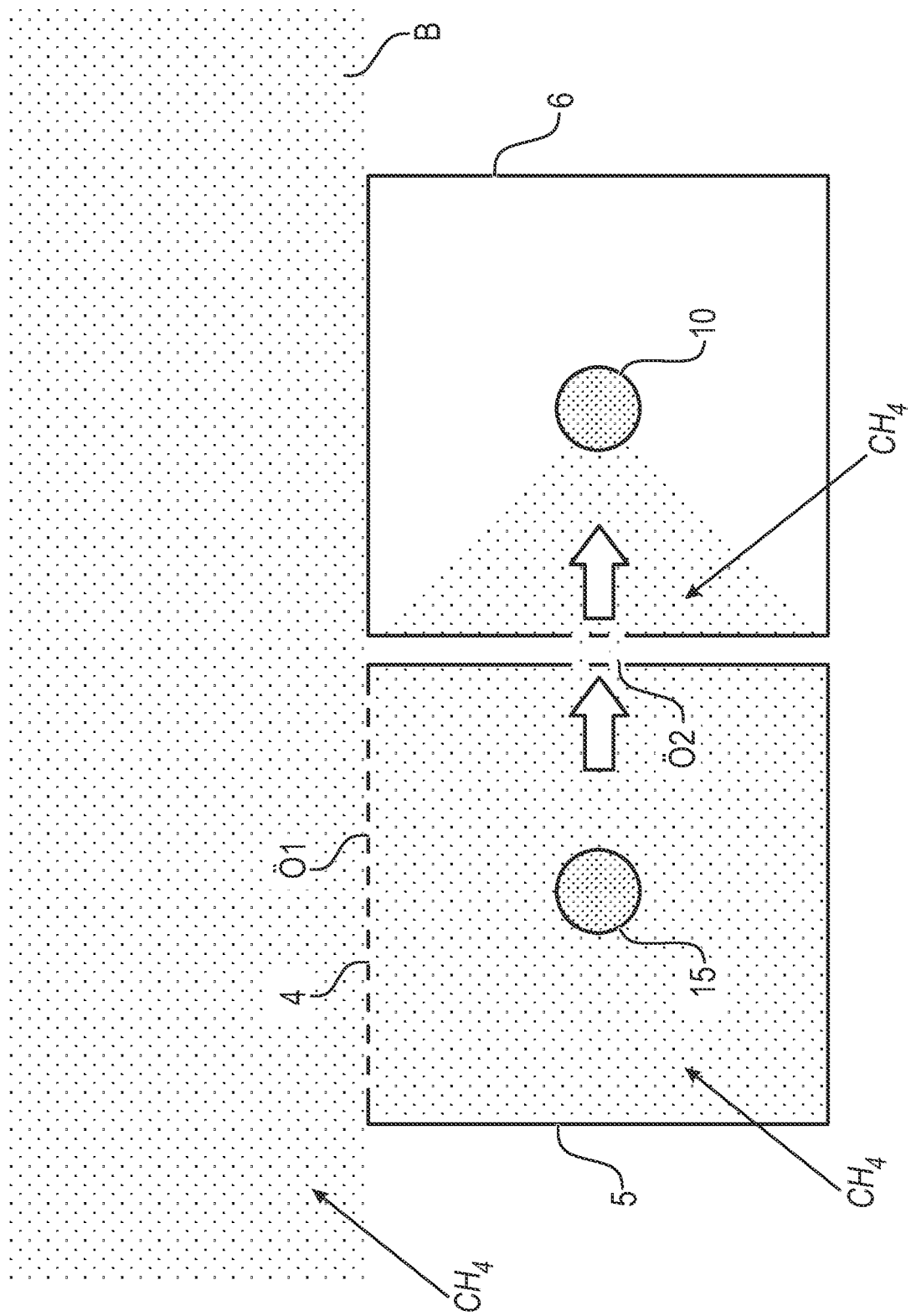
FIG. 6 is a schematic view showing the gas detection device from FIG. 2, with the modulator deactivated.

FIG. 5 and FIG. 6 schematically show the gas detection device 100 from FIG. 2, wherein a combustible target gas, here methane ($CH_4$), is present in the area B to be monitored. The target gas flows through the outer opening Ö1 into the modulator chamber 5. The target gas $CH_4$ is indicated by dots in FIG. 5 and FIG. 6.

FIG. 5 shows a situation, in which the modulator 15 is heated to a high temperature. The modulator 15, which is embodied as a pellistor, oxidizes the greatest part of the target gas in the modulator chamber 15 and thus burns most of the target gas. Therefore, practically no target gas flows through the inner opening Ö2 into the detector chamber 6.

FIG. 6 shows a situation, in which the modulator 15 is heated to a lower temperature or is even switched off. The modulator 15 oxidizes only a small part of the target gas or no target gas at all. Therefore, at least a part of the combustible target gas flows through the inner opening Ö2 into the detector chamber 6. The detector 10, which embodied as a pellistor, oxidizes and therefore burns the target gas in the detector chamber 6 and is heated further.

Figure 7:
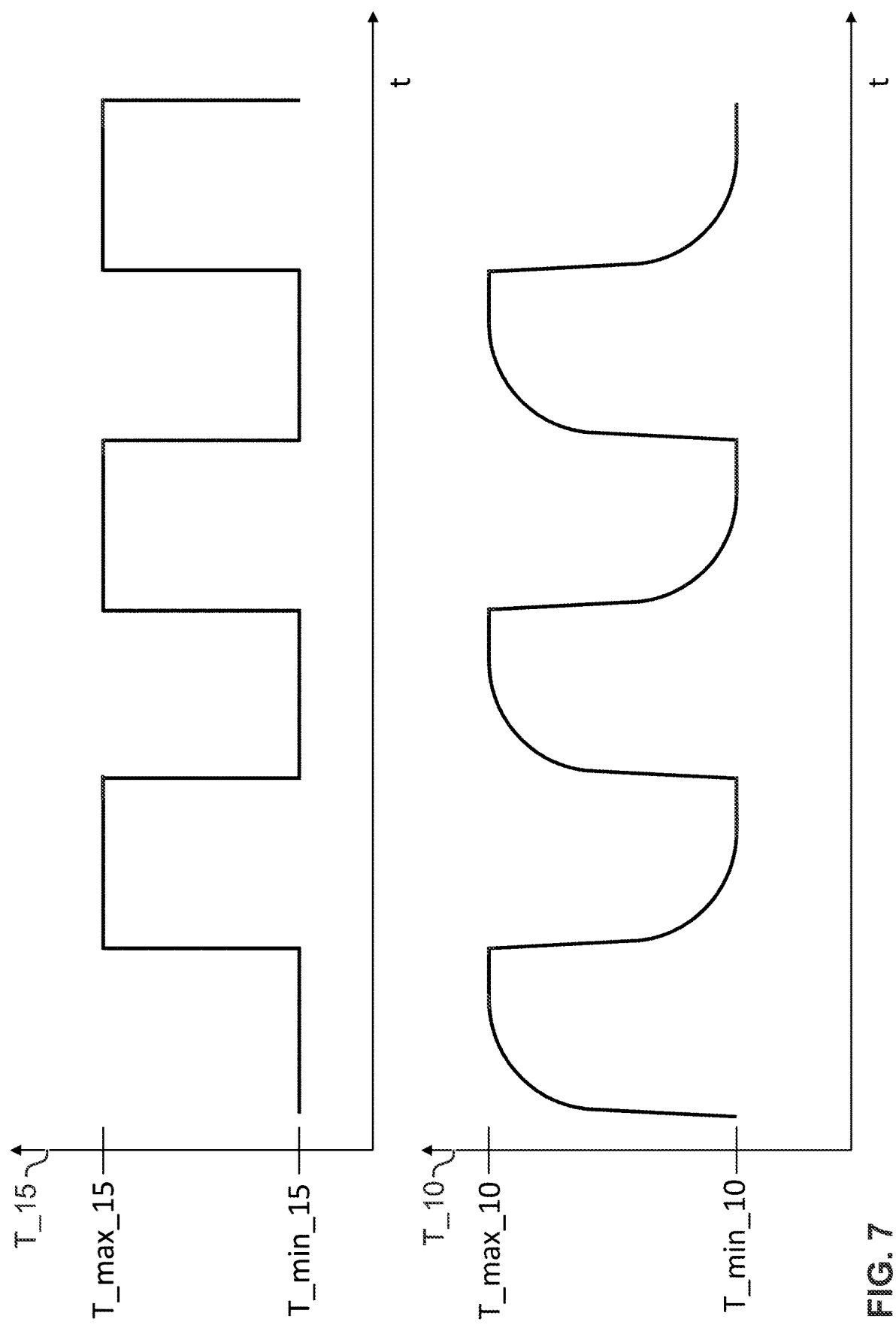
FIG. 7 is a graph showing the idealized time course of the modulator voltage (top) and of the detector temperature (bottom) in the presence of a combustible target gas.
Figure 8:
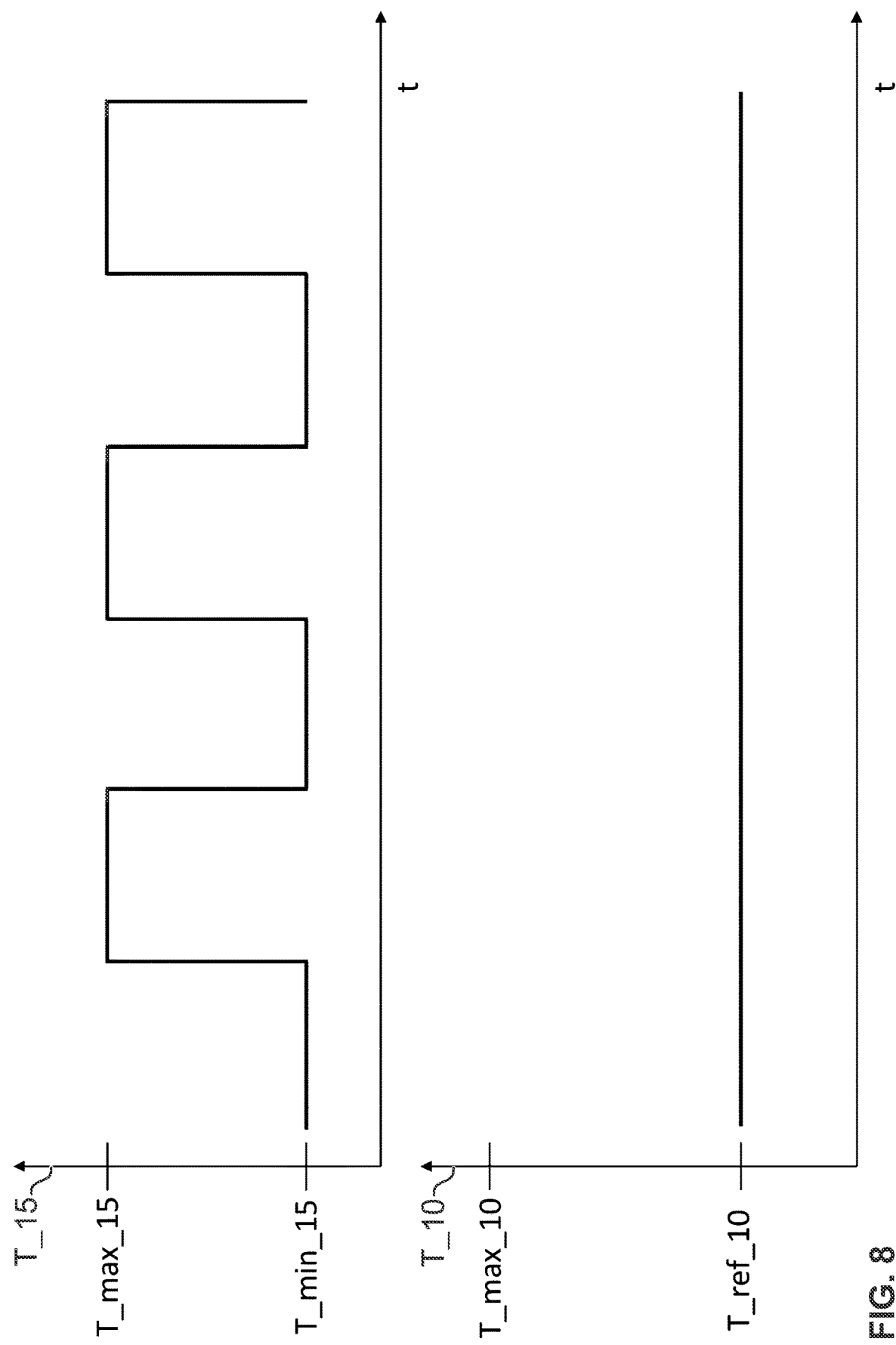
FIG. 8 is a graph showing the time course from FIG. 7 in the absence of a combustible target gas.

FIG. 7 and FIG. 8 show, as examples, idealized time courses of the temperature T_15 of the modulator 15 (top) and the temperature T_10 of the detector 10 (bottom). The modulator temperature T_15 is preferably controlled as this was just described with reference to FIG. 4b. The detector temperature T_10 is measured directly or indirectly as described above. In the example shown, the modulator temperature T_15 is controlled such that it fluctuates back and forth between the lower temperature T_min_15 and the higher temperature T_max_15, without a time delay in the idealized example shown. At the higher temperature T_max_15, the modulator 15 oxidizes more combustible target gas in the modulator chamber 15 than at the lower temperature T_min_15. The time courses of the modulator temperature T_15 coincide in FIG. 7 and FIG. 8.

The electrical voltage U_10 being applied to the detector 10 is controlled in this example such that the intensity I.1 of the current flowing through the detector 10 remains constant. How this control is carried out was described with reference to FIG. 4a. The voltage sensor 20.1 measures the voltage U_10, which is applied to the detector 10 and which acts as a detection variable in one embodiment. The heat energy, which the electric current feeds to the detector 10, depends on the known variables I.1 and U_10.

If no combustible target gas is present in the area B to be monitored, then the detector temperature T_10 is changed only relatively slowly, namely because of changing ambient conditions. During oxidation of a target gas, the detector temperature T_10 is changed, by contrast, much more rapidly. Changing ambient conditions do not, as a rule, bring about a rapid oscillation of the detector temperature T_10. Fluctuations over time of the detector temperature T_10 therefore result from a concentration of the target gas, which concentration varies over time, in the detector chamber 6.

In the example shown in FIG. 2, the detector temperature T_10 is measured and used as a detection variable. The electrical resistance of the detector 10 correlates with the temperature T_10 thereof, and the detector temperature T_10 correlates with the concentration of the target gas in the detector chamber 6. If the current intensity I.1 and the voltage U_10 being applied to the detector 10 are measured, the electrical resistance can be derived and is an indicator of the detector temperature T_10. If especially the current intensity I.1 is kept constant (one embodiment of the control according to FIG. 4a), then the electrical voltage U_10 being applied to the detector 10 can be used as a detection variable. If, conversely, the voltage U_10 is kept constant, the current intensity I.1 can be used as a detection variable.

FIG. 7 and FIG. 8 show in an idealized manner the time courses of the temperatures T_15 and T_10 in a situation, in which a quantity of a gas mixture flows from the monitored area B into the modulator chamber 5. A part of this gas mixture flows out of the modulator chamber 5 through the inner opening Ö2 into the detector chamber 6. In the situation shown in FIG. 7, a combustible gas is present in the area B to be monitored, but not present in the situation shown in FIG. 8. The time course of the modulator temperature T_15 coincides in FIG. 7 and FIG. 8.

In a time interval, in which the modulator temperature T_15 has the higher value T_max_15, a considerable part of the combustible target gas in the modulator chamber 5 is oxidized, of course, only if the gas mixture contains a combustible target gas. Therefore, the gas mixture, which flows through the inner opening Ö2 into the detector chamber 6, contains only a relatively low concentration of the combustible target gas even if the area B contains this target gas. The heated detector 10 is therefore capable of oxidizing only a little target gas or even no target gas at all and therefore is heated also only little by combustible target gas.

In a time interval, in which the modulator temperature T_15 has the lower value T_min_15, only a small part or no part at all of the combustible target gas in the modulator chamber 5 is oxidized. Therefore, the gas mixture, which flows through the inner opening Ö2 into the detector chamber, contains relatively much combustible gas, provided that the gas mixture contains this combustible target gas.

FIG. 7 shows that the time course of the detector temperature T_10 oscillates between a maximum value T_max_10 and a minimum value T_min_10, provided the area B contains the combustible target gas. In a time interval, in which the modulator 15 has the lower temperature T_min_15, the detector temperature T_10 increases up to the maximum value T_max_10. In a time interval, in which the modulator 15 has the higher temperature T_max_15, the detector temperature T_10 drops again to the minimum value T_min_10.

FIG. 8 shows in an idealized view the time courses of the modulator temperature T_15 and of the detector temperature T_10, wherein the electrical voltages U_15 and U_10 have the same time courses, which lead to the time courses of FIG. 7. In the example of FIG. 8, by contrast to the example from FIG. 7, no combustible target gas is present in the environment of the gas detection device 100, which is why no target gas flows into the detector chamber 6, regardless of how high the modulator temperature T_15 is. The temperature T_10 of the detector remains constant at a reference value T_ref_10, which depends only on the current intensity I.1 and on the voltage U_10.

The analysis unit 9 automatically determines whether the detector temperature T_10 oscillates significantly, as this is shown in FIG. 7, or whether it remains constant, as shown in FIG. 8.

Figure 9:
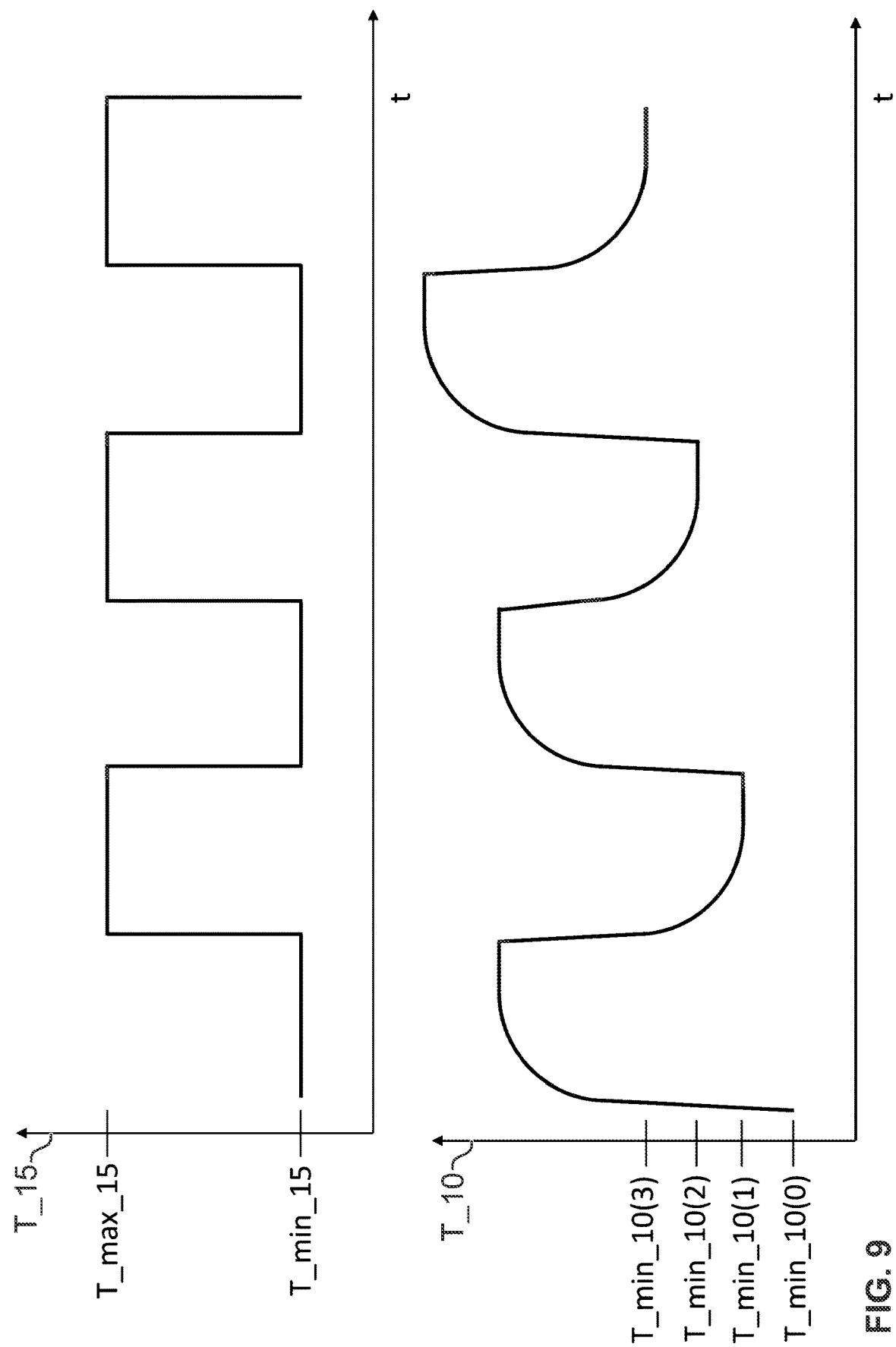
FIG. 9 is a graph showing the time courses from FIG. 7 in case of changing ambient conditions in the detector chamber, target gas present.

The views from FIG. 7 and FIG. 8 are idealized views. In practice, at least one ambient condition or a condition in the detector chamber 6 or both the ambient condition and the detector chamber condition can be changed. FIG. 9 schematically illustrates the effect of such a change. Just as in FIG. 7 and FIG. 8, the time t is plotted on the x-axis and the modulator temperature T_15 (top) as well as the detector temperature T_10 (bottom) are plotted on the y-axis in FIG. 9 as well. Combustible target gas flows out of the environment through the outer opening Ö1 into the modulator chamber 5 and when the modulator temperature T_15 has the lower value T_min_15, flows further through the inner opening Ö2 into the detector chamber 6. The detector temperature T_10 therefore oscillates. The minimum value T_min_10 is shifted, however, from oscillation to oscillation, which is indicated by the increasing minimum values T_min_10(0)<T_min_10(1)<T_min_10(2)<T_min_10(3). In this case as well, the analysis unit 9 detects the significant oscillation of the detector temperature T_10 and automatically determines that a combustible target gas is present.

If a time interval, in which the modulator temperature T_15 has the higher value T_max_15, is sufficiently long, then a large quantity of combustible target gas in the modulator chamber 5 is oxidized. Therefore, at the end of this time interval, only a relatively small quantity of the target gas is present in the modulator chamber and therefore only a negligibly small quantity of the target gas is present in the detector chamber 6. The analysis unit 9 uses the low temperature T_min_10(0)<T_min_10(1)<T_min_10(2)<T_min_10(3) at the end of this time interval as the current reference temperature of the detector 10, i.e., as the value of the detector temperature T_10, which occurs when the detector chamber 6 is free from target gas. This reference temperature can also be designated as the zero point of the detection variable of the detector 10. The subsequent increase of the detector temperature T_10 correlates with the current concentration of the target gas in the detector chamber 6. The gas detection device 100 according to the present invention hence carries out an automatic adjustment of the detector zero point. It is also possible to determine a reference voltage as a zero point of the detection variable.

Figure 10:
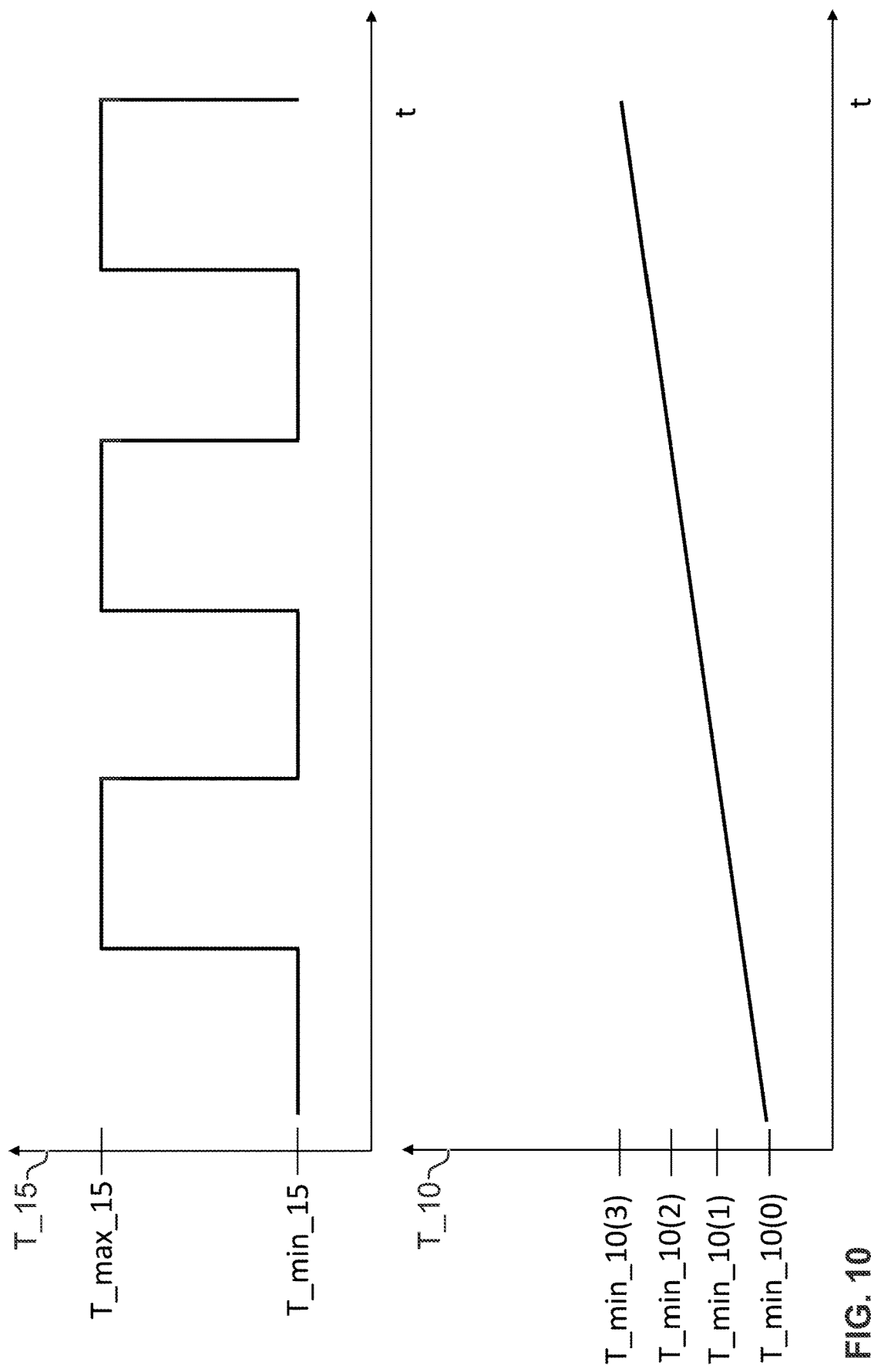
FIG. 10 is a graph showing the time courses in the situation from FIG. 9, no target gas present.

FIG. 10 schematically shows the two time courses, wherein the time courses of the electrical voltages being applied to the detector 10 and to the modulator 15 as well as the ambient conditions are the same as in FIG. 9, wherein, however, no target gas is present. Because of the changing ambient conditions, the detector temperature T_10 increases slowly, without oscillating.

Figure 11:
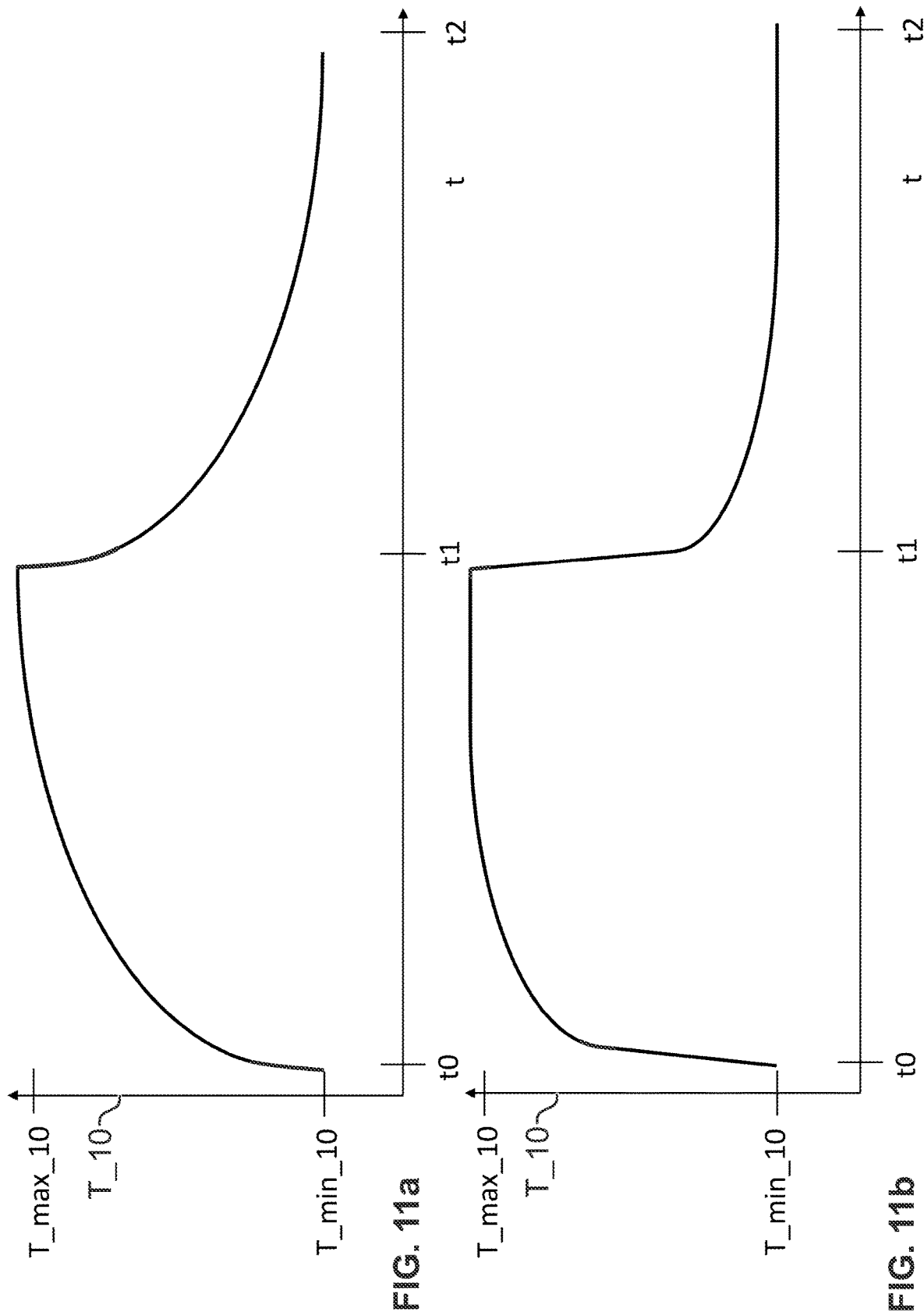
FIG. 11a is a graph showing one of different idealized time courses of the detector temperature for different target gases.
FIG. 11b is a graph showing another of different idealized time courses of the detector temperature for different target gases.

In the views from FIG. 2 through FIG. 10, it was at least detected whether a combustible target gas is present or not. Optionally, the concentration of the target gas was determined at least approximately by analysis of measured values. In some situations, it is, in addition, possible to identify different combustible target gases by analysis of the time course of the detector temperature T_10. FIGS. 11a and 11b illustrate this in an idealized view.

Ambient air containing a combustible target gas flows out of the area B into the modulator chamber 5. In the time period from t0 to t1, the modulator temperature T_15 has the lower value T_min_15, and has the higher value T_max_15 in the time from t1 to t2. Therefore, in the time period from t0 to t1, a greater quantity of the combustible target gas flows, in an idealized manner, into the detector chamber 6, a smaller quantity of combustible target gas or none at all in the time from t1 to t2.

In FIG. 11a, a combustible target gas of a first species flows into the detector chamber 6 and leads to a relatively slow increase of the detector temperature T_10 up to the maximum value T_max_10. In FIG. 11b, a combustible target gas of a second species flows into the detector chamber 6 and leads to a relatively rapid increase of the detector temperature T_10 up to the maximum value T_max_10. The analysis unit 9 is capable of distinguishing these two situations from one another and as a result to automatically determine whether no combustible target gas at all above the detection limit, target gas of the first species or target gas of the second species is present in the monitored area B.

Figure 12:
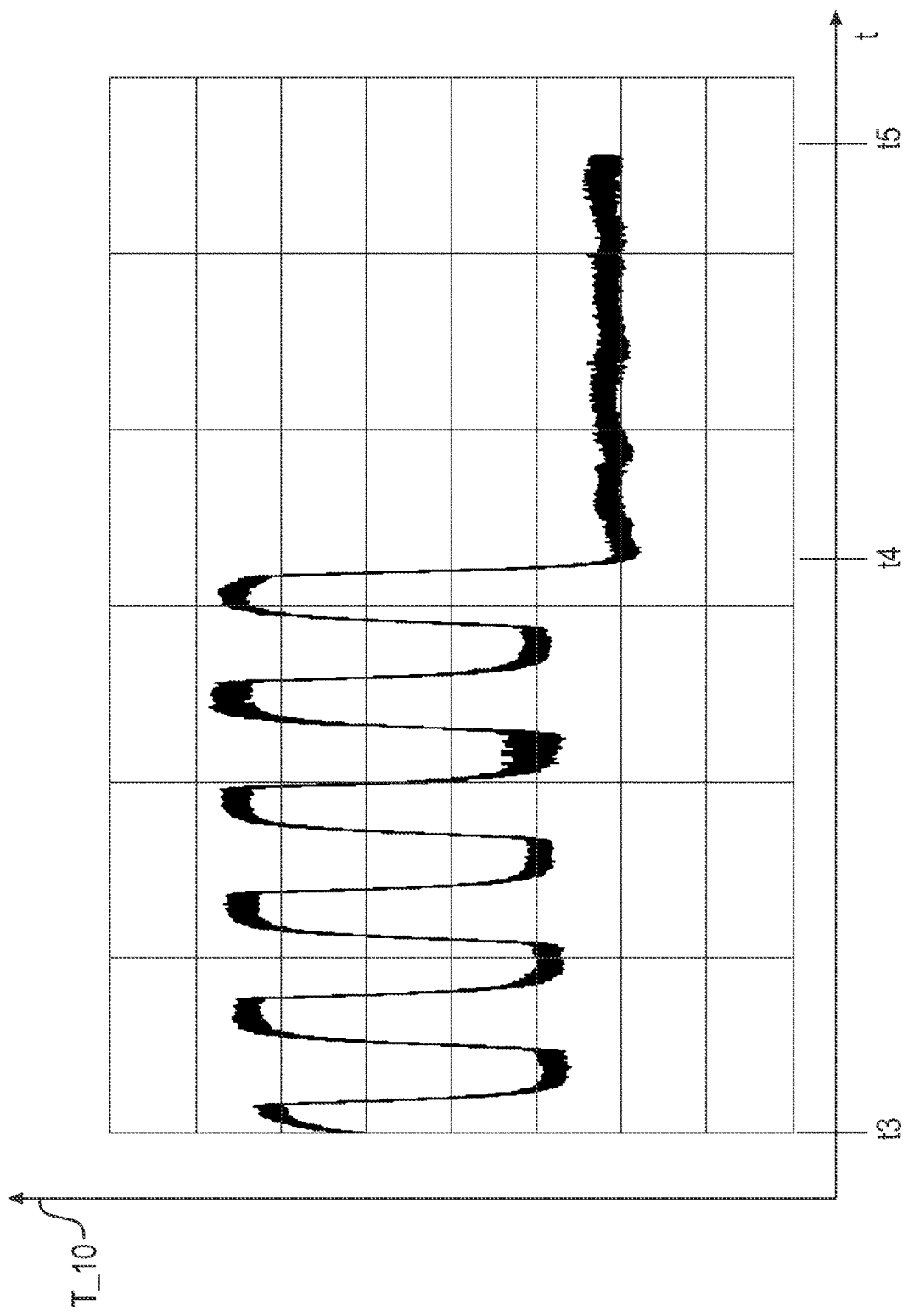
FIG. 12 is a graph showing a time course of the detector temperature, which time course was measured in a test.

FIG. 12 shows, as an example, the time course of the detector temperature T_10, which was measured in a real test. In the entire time period from t3 to t5, the modulator temperature T_15 oscillates, as this is indicated in FIG. 7 through FIG. 10. In the time period from t3 to t4, a combustible target gas is located in the area B, but not in the time period from t4 to t5. When the modulator temperature T_15 has the lower value T_min_15, a lot of combustible target gas hence reaches the detector chamber 6; otherwise, only a little combustible target gas. By contrast, the detector temperature T_10 oscillates, and the analysis unit 9 detects no significant oscillation in the time period from t4 to t5. A slight oscillation in the entire time period from t3 to t5 results in this case from the fact that the modulator chamber 5 and the detector chamber 6 are not fully thermally insulated from one another, on the one hand, and from varying ambient conditions, from variable conditions in the detector chamber 6 and/or from an unavoidable measurement noise, on the other hand. The analysis unit 9 is capable of automatically distinguishing this slight oscillation from the significant oscillation in the time period from t3 to t4 and thereby of determining that combustible target gas is located in the environment of the gas detection device 100 only in the time period from t3 to t4.

While specific embodiments of the invention have been shown and described in detail to illustrate the application of the principles of the invention, it will be understood that the invention may be embodied otherwise without departing from such principles.

LIST OF REFERENCE NUMBERS

1 Detector chamber with the openings Ö1 and Ö2; it encloses the detector 10; it belongs to the gas detection device 101
2 Compensator chamber with the opening Ö2; it encloses the compensator 11; it belongs to the gas detection device 101
3 Electrical line, which connects the detector 10 and the compensator 11 to a voltage source (series connection); it belongs to the gas detection device 101
3.1 Electrical line, which connects the detector 10 to a voltage source 43; it belongs to the gas detection device 100 according to the present invention
3.2 Electrical line, which connects the modulator 15 to a voltage source 44; it belongs to the gas detection device 100 according to the present invention
4 Explosion protection grille in the outer opening Ö1
5 Modulator chamber with the openings Ö1 and Ö2; it encloses the detector 10 in a gas-tight manner
6 Detector chamber with the inner opening Ö2; it encloses the detector 10 in a gas-tight manner
7 Actuatable voltage controller in the electrical line 3.2, for example, a switch, for closing and opening a current circuit
9 Analysis unit; it receives measured values from the voltage sensors 20.1 and 20.2 or 20.1 and 20.3
10 Detector in the form of a pellistor; it is supplied with current via the electrical line 3 or 3.1 by the voltage source 42 in the detector chamber 1 or 6; it belongs to the gas detection device according to the present invention and to the gas detection device 101
11 Compensator in the form of a pellistor in the compensator chamber 2; it is supplied with current via the electrical line 3; it belongs to the gas detection device 101
15 Modulator in the form of a pellistor in the modulator chamber 5; it is supplied with current by the voltage source 44 via the electrical line 3.2; it belongs to the gas detection device 100 according to the present invention
18 Thermal barrier between the modulator chamber 5 and the detector chamber 6
20.1 Voltage sensor; it measures the electrical voltage U_10 being applied to the detector 10
20.2 Voltage sensor; it measures the electrical voltage U_11 being applied to the modulator 15
21.1 Current intensity sensor; it measures the current intensity I.1 of the current flowing through the detector 10
21.2 Current intensity sensor; it measures the current intensity I.2 of the current flowing through the modulator 15
23 Heating segment of the detector 10; it is enclosed by the ceramic jacketing 25
24 Electrical connections and mechanical brackets for the heating segment 23
25 Electrically insulating ceramic jacketing around the heating segment 23
26 Coating on and/or in the ceramic jacketing 25; it consists of a catalytic material
26 Mounting plate of the detector 10
30.1 Temperature sensor; it measures the temperature T_10 of the detector 10
30.2 Temperature sensor; it measures the temperature T_15 of the modulator 15
40 Data-processing control device; it receives measured values from the sensors 20.1, 20.2, 21.1, 21.2, 30.1, 30.2; it actuates the voltage change units 41 and 42
41 Voltage change unit, which is capable of changing the voltage U_10 being applied to the detector 10
42 Voltage change unit, which is capable of changing the voltage U_15 being applied to the modulator 15
43 Voltage source for the detector 10
44 Voltage source for the modulator 15
100 Gas detection device according to the present invention of the exemplary embodiment; it comprises the detector 10, the modulator 15, the detector chamber 6, the modulator chamber 5, the voltages sensors 20.1 and 20.2, the current intensity sensors 21.1 and 21.2, the control device 40 with the analysis unit 9, the voltage change units 41 and 42 and the electrical lines 3.1 and 3.2
101 Gas detection device according to the state of the art; it comprises the detector 10, the compensator 11, the detector chamber 1, the compensator chamber 2, the analysis unit 9 and the electrical line 3
B Area to be monitored for target gas
ΔI.1 Deviation between I.1_soll and I.1
ΔT_15 Deviation between T_15_soll and T_15
I.1 Current intensity in the electrical line 3.1; at the same time, intensity of the current, which flows through the detector 10, measured by the current intensity sensor 21.1

I.1_soll Predefined time course of the desired or required current intensity I.1

I.2 Current intensity in the electrical line 3.2; at the same time, intensity of the current, which flows through the detector 10, measured by the current intensity sensor 21.2

I.3 Current intensity in the electrical line 3; at the same time, intensity of the current, which flows through the detector 10 and the compensator 11

Ö1 Opening in the detector chamber 1 (gas detection device 101) and in the modulator chamber 5 (gas detection device 100 according to the present invention); it receives the explosion protection grille 4; it acts as an outer fluid connection Ö2 Opening between the detector chamber 1 and the compensator chamber 2 (gas detection device 101) as well as opening between the modulator chamber 5 and the detector chamber 6 (gas detection device 100 according to the present invention); it acts as an inner fluid connection T_10 Temperature of the detector 10; it correlates with the concentration of the target gas in the detector chamber 6; it is measured in one embodiment directly by the temperature sensor 30.1

T_15 Temperature of the modulator 15; it is measured in one embodiment directly by the temperature sensor 30.2; it is controlled by the control device 40

T_15_soll Predefined time course of the desired or required modulator temperature T_15

T_max_10 Maximum value of the oscillating detector temperature T_10 in the presence of a combustible target gas T_min_10 Minimum value of the oscillating detector temperature T_10 in the presence of a combustible target gas T_ref_10 Reference value of the detector temperature T_10, if no combustible target gas is present T_max_15 Greater value of the modulator temperature T_15

What is claimed is:

1. A gas detection device for monitoring an area to be monitored for the presence of a combustible target gas, the gas detection device comprising:
    a detector chamber,
    a modulator chamber in fluid connection with the area to be monitored;
    a detector configured such that an application of an electrical voltage to the detector brings about a heating of a detector component of the detector as a function of the electrical voltage being applied to the detector, the heating of the detector component brings about an oxidation of the target gas located in the detector chamber as a function of the temperature of the detector component and an oxidation of the target gas in the detector chamber increases the temperature of the detector;
    a modulator enclosed by the modulator chamber and configured such that an application of an electrical voltage to the modulator brings about a heating of a modulator component of the modulator as a function of the electrical voltage being applied to the modulator and the heating of the modulator component brings about an oxidation of a target gas located in the modulator chamber as a function of the temperature of the modulator component;
    the modulator chamber having an inner fluid connection between the modulator chamber and the detector chamber, wherein the detector chamber is configured to receive fluid directly from the modulator chamber via the inner fluid connection, the detector chamber separating the detector from the area to be monitored, except for the inner fluid connection, such that the detector chamber provides a gas-tight separation of the detector from the area to be monitored or a cross-sectional area of a fluid connection between the detector chamber and the area to be monitored is at most 25% of the cross-sectional area of the inner fluid connection;
    a detector sensor arrangement comprising a detector sensor configured to measure a detection variable of the detector wherein the detection variable is the detector temperature or a parameter of the detector which detector parameter correlates with the detector temperature, wherein the gas detection device is configured:
        to apply an electrical voltage to the modulator such that the temperature of the modulator oscillates over time as a modulator temperature oscillation;
        to apply an electrical voltage to the detector such that the temperature of the detector, which detector temperature is increased by the application of the electrical voltage, does not oscillate over time at all or oscillates with a lower oscillation amplitude than the oscillation of the temperature of the modulator in a predefined analysis period; and
    a signal-processing analysis unit configured:
        to check whether or not the detection variable of the detector oscillates during the analysis period synchronously with the modulator temperature oscillation as a detection variable synchronous oscillation; and
        to determine that the target gas is present in the area to be monitored upon detecting the detection variable synchronous oscillation.

2. A gas detection device in accordance with claim 1, wherein:
    the gas detection device is configured to apply an electrical voltage to the modulator such that the modulator temperature increases in at least five different increase periods and decreases in at least five different decrease periods; and
    each decrease period follows a respective increase period over time.

3. A gas detection device in accordance with claim 1, further comprising a modulator sensor arrangement comprising at least one modulator sensor configured to measure the modulator temperature or a parameter of the modulator, which modulator parameter correlates with the modulator temperature, wherein the analysis unit is configured to determine that the target gas is present as a function of the presence of the synchronous detection variable oscillation and, in addition, as a function of the measured modulator temperature.

4. A gas detection device in accordance with claim 1, further comprising:
    a modulator sensor arrangement comprising a modulator controllable variable sensor configured to measure an indicator of a controllable variable of the modulator, wherein the controllable variable is the modulator temperature or correlates with the modulator temperature; and
    a signal-processing control device configured to control the controllable variable of the modulator using measured values of the modulator controllable variable sensor with a control gain that an actual time course of the controllable variable of the modulator follows a predefined oscillating time course of the controllable variable.

5. A gas detection device in accordance with claim 4, wherein the controllable variable of the modulator is one of the electrical voltage being applied to the modulator, a current intensity of electric current flowing through the modulator, an electrical resistance of the modulator, electrical power consumed by the modulator or a temperature of the modulator.

6. A gas detection device in accordance with claim 1, further comprising a signal-processing control device, wherein:
the detector sensor arrangement further comprises a detector controllable variable sensor configured to measure an indicator of a controllable variable of the detector, wherein the controllable variable of the detector is the temperature of the detector or correlates with the temperature of the detector and is different from the detection variable of the detector; and
the control device is configured to control the electrical voltage being applied to the detector using measured values of the detector controllable variable sensor with a control gain that
an actual time course of the controllable variable of the detector follows a predefined time course of the controllable variable.

7. A gas detection device in accordance with claim 6, wherein the controllable variable of the detector is the electrical voltage being applied to the detector with the detection variable of the detector not being the electrical voltage, or is the current intensity of current flowing through the detector with the detection variable of the detector not being the current intensity, or is an electrical resistance of the detector with the detection variable of the detector not being the electrical resistance, or is electrical power consumed by the detector with the detection variable of the detector not being the electrical power, or is the temperature of the detector with the detection variable of the detector not being the temperature.

8. A gas detection device in accordance with claim 6, wherein the control gain is the controllable variable of the detector remaining constant in the analysis period.

9. A gas detection device in accordance with claim 1, wherein:
the electrical voltage is applied to the modulator such that the temperature of the modulator oscillates at least in the analysis period between a minimum temperature value and a maximum temperature value; and
the analysis unit is configured:
to determine a reference value of the detection variable; and
to use the determined reference value as a current reference value for the detection variable in the absence of the target gas; and
to determine a value as the reference value, which determined value the detector sensor arrangement has measured in the analysis period when the modulator temperature has the maximum temperature value.

10. A gas detection device in accordance with claim 9, wherein the analysis unit is configured to determine information about a current concentration and/or a species of the target gas as a function of the determined reference value and of a measured subsequent increase of the detection variable.

11. A process for the automatic monitoring of an area for the presence of a combustible target gas, the process comprising the steps of:
providing a gas detection device, the gas detection device comprising: a detector; a modulator; a modulator chamber enclosing the modulator and being in fluid connection with the area to be monitored; a detector chamber, the gas detection device having an inner fluid connection between the modulator chamber and the detector chamber, wherein the detector chamber is configured to receive fluid from the modulator chamber directly via the inner fluid connection, the detector chamber separating the detector from the area to be monitored, except for the inner fluid connection, such that the detector chamber provides a gas-tight separation of the detector from the area to be monitored or a cross-sectional area of a fluid connection between the detector chamber and the area to be monitored is at most 25% of the cross-sectional area of the inner fluid connection; a detector sensor arrangement comprising a detector sensor; and a signal-processing analysis unit;
the process comprises the steps of
applying an electrical voltage to the modulator to heat a modulator component of the modulator as a function of the applied voltage such that the temperature of the modulator oscillates over time and the heating of the modulator component brings about an oxidation of a target gas, which is located in the modulator chamber, as a function of the temperature of the modulator;
applying an electrical voltage to the detector to bring about a heating of a detector component of the detector as a function of the electrical applied voltage, wherein the temperature of the detector is increased by the application of the electrical voltage and does not oscillate over time at all or oscillates with a lower amplitude than the temperature of the modulator in a predefined analysis period, the heating of the detector brings about an oxidation of a target gas, which is located in the detector chamber, as a function of the temperature of the detector, an oxidation of a target gas in the detector chamber brings about an increase in the temperature of the detector;
with the detector sensor, measuring a detection variable of the detector wherein the detection variable is the detector temperature or a parameter of the detector which detector parameter correlates with the detector temperature;
checking whether the detection variable of the detector oscillates synchronously with the oscillation of the modulator temperature in the analysis period; and
determining that the combustible target gas is present in the area upon a synchronous oscillation over time of the detection variable being detected.

12. A gas detection device for monitoring an area to be monitored for the presence of a combustible target gas, the gas detection device comprising:
a detector chamber,
a modulator chamber in fluid connection with the area to be monitored;
a detector configured such that an application of an electrical voltage to the detector brings about a heating of a detector component of the detector as a function of the electrical voltage being applied to the detector, the heating of the detector component brings about an oxidation of the target gas located in the detector chamber as a function of the temperature of the detector component and an oxidation of a target gas in the detector chamber increases the temperature of the detector;

a modulator enclosed by the modulator chamber and configured such that an application of an electrical voltage to the modulator brings about a heating of a modulator component of the modulator as a function of the electrical voltage being applied to the modulator and the heating of the modulator component brings about an oxidation of a target gas located in the modulator chamber as a function of the temperature of the modulator component;

the modulator chamber having an inner fluid connection between the modulator chamber and the detector chamber, the detector chamber separating the detector from the area to be monitored, except for the inner fluid connection, such that the detector chamber provides a gas-tight separation of the detector from the area to be monitored or a cross-sectional area of a fluid connection between the detector chamber and the area to be monitored is at most 25% of the cross-sectional area of the inner fluid connection, wherein the detector chamber is configured to receive fluid directly from the modulator chamber only via the inner fluid connection;

a detector sensor arrangement comprising a detector sensor configured to measure a detection variable of the detector wherein the detection variable is the detector temperature or a parameter of the detector which detector parameter correlates with the detector temperature, wherein the gas detection device is configured:

to apply an electrical voltage to the modulator such that the temperature of the modulator oscillates over time as a modulator temperature oscillation;

to apply an electrical voltage to the detector such that the temperature of the detector, which detector temperature is increased by the application of the electrical voltage, does not oscillate over time at all or oscillates with a lower oscillation amplitude than the oscillation of the temperature of the modulator in a predefined analysis period; and a signal-processing analysis unit configured:

to check whether or not the detection variable of the detector oscillates during the analysis period synchronously with the modulator temperature oscillation as a detection variable synchronous oscillation; and to determine that the target gas is present in the area to be monitored upon detecting the detection variable synchronous oscillation.

13. A gas detection device in accordance with claim 12, wherein:

the gas detection device is configured to apply an electrical voltage to the modulator such that the modulator temperature increases in at least five different increase periods and decreases in at least five different decrease periods; and each decrease period follows a respective increase period over time.

14. A gas detection device in accordance with claim 12, further comprising a modulator sensor arrangement comprising at least one modulator sensor configured to measure the modulator temperature or a parameter of the modulator, which modulator parameter correlates with the modulator temperature, wherein the analysis unit is configured to determine that the target gas is present as a function of the presence of the synchronous detection variable oscillation and, in addition, as a function of the measured modulator temperature.

15. A gas detection device in accordance with claim 12, further comprising:

a modulator sensor arrangement comprising a modulator controllable variable sensor configured to measure an indicator of a controllable variable of the modulator, wherein the controllable variable is the modulator temperature or correlates with the modulator temperature; and a signal-processing control device configured to control the controllable variable of the modulator using measured values of the modulator controllable variable sensor with a control gain that an actual time course of the controllable variable of the modulator follows a predefined oscillating time course of the controllable variable.

16. A gas detection device in accordance with claim 15, wherein the controllable variable of the modulator is one of the electrical voltage being applied to the modulator, a current intensity of electric current flowing through the modulator, an electrical resistance of the modulator, electrical power consumed by the modulator or a temperature of the modulator.

17. A gas detection device in accordance with claim 12, further comprising a signal-processing control device, wherein:

the detector sensor arrangement further comprises a detector controllable variable sensor configured to measure an indicator of a controllable variable of the detector, wherein the controllable variable of the detector is the temperature of the detector or correlates with the temperature of the detector and is different from the detection variable of the detector; and the control device is configured to control the electrical voltage being applied to the detector using measured values of the detector controllable variable sensor with a control gain that an actual time course of the controllable variable of the detector follows a predefined time course of the controllable variable.

18. A gas detection device in accordance with claim 17, wherein the controllable variable of the detector is the electrical voltage being applied to the detector with the detection variable of the detector not being the electrical voltage, or is the current intensity of current flowing through the detector with the detection variable of the detector not being the current intensity, or is an electrical resistance of the detector with the detection variable of the detector not being the electrical resistance, or is electrical power consumed by the detector with the detection variable of the detector not being the electrical power, or is the temperature of the detector with the detection variable of the detector not being the temperature.

19. A gas detection device in accordance with claim 17, wherein the control gain is the controllable variable of the detector remaining constant in the analysis period.

20. A gas detection device in accordance with claim 12, wherein:

the electrical voltage is applied to the modulator such that the temperature of the modulator oscillates at least in the analysis period between a minimum temperature value and a maximum temperature value; and the analysis unit is configured:

to determine a reference value of the detection variable; and to use the determined reference value as a current reference value for the detection variable in the absence of the target gas; and to determine a value as the reference value, which determined value the detector sensor arrangement has measured in the analysis period when the modulator temperature has the maximum temperature value.

\* \* \* \* \*